United States Patent [19]

Petry et al.

[11] Patent Number: 5,548,713
[45] Date of Patent: Aug. 20, 1996

[54] ON-BOARD DIAGNOSTIC TESTING

[75] Inventors: Keith L. Petry, North Reading; Thomas S. Hirsch, Bedford, both of Mass.; James W. Keeley, Nashua, N.H.

[73] Assignee: Bull HN Information Systems Inc., Billerica, Mass.

[21] Appl. No.: 272,893

[22] Filed: Jul. 8, 1994

Related U.S. Application Data

[63] Continuation of Ser. No. 776,953, Oct. 15, 1991, abandoned.

[51] Int. Cl.$^6$ ................................................. G06F 11/00
[52] U.S. Cl. .............................. 395/183.01; 395/183.03; 395/183.06
[58] Field of Search ................................. 371/22.5, 22.6, 371/16.1, 18, 25.1, 15.1, 16.5; 364/483; 395/575; 324/731

[56] References Cited

U.S. PATENT DOCUMENTS

| | | | |
|---|---|---|---|
| 3,714,403 | 1/1973 | Ammann et al. | 235/153 OR |
| 4,183,459 | 1/1980 | Donn et al. | 324/73.1 |
| 4,322,846 | 3/1982 | Carroll et al. | 371/16.1 |
| 4,433,413 | 2/1984 | Fasang | 371/25.1 |
| 4,559,626 | 12/1985 | Brown | 371/21 OR |
| 5,157,668 | 10/1992 | Buenzli, Jr. et al. | 371/15.1 |
| 5,157,782 | 10/1992 | Tuttle et al. | 395/575 OR |
| 5,173,903 | 12/1992 | Zellery et al. | 371/16.1 OR |

OTHER PUBLICATIONS

Microsoft Press Computer Dictionary —Second Edition p. 167.

*Primary Examiner*—Emanuel T. Voeltz
*Assistant Examiner*—M. Kemper
*Attorney, Agent, or Firm*—Faith F. Driscoll; John S. Solakian

[57] ABSTRACT

A processing unit couples to a system bus and includes a microprocessor which tightly couples to a local memory. The processing unit also includes an addressable electrically erasable programmable read only memory (EEPROM) unit which couples to the microprocessor and to the system bus. The EEPROM unit stores in first and second separate regions, on-board diagnostic (OBD) routines and boot routines, respectively. The OBD routines are organized into a plurality of categories or phases. The processing unit includes a register accessible only by the microprocessor which, under the control of the OBD routines, is loaded with a number of predetermined values at the beginning of each individual OBD routine for identifying a particular phase and subphase of testing to be performed. Means coupled to the register is directly connected to display a first phase portion of the contents of the register for indicating during which phase of testing a failure occurred. The phase and subphase contents of the register are used to identify the actual test which failed. This information provides an index into a test dictionary which indicates the specific component or group of components which failed.

12 Claims, 19 Drawing Sheets

PHASE 26
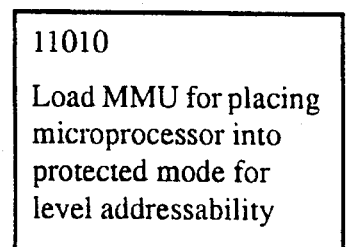
11010
Load MMU for placing microprocessor into protected mode for level addressability
PHASE 25
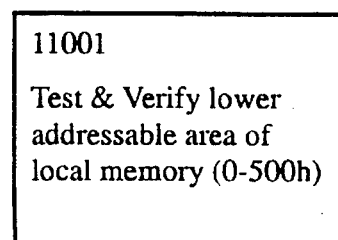
11001
Test & Verify lower addressable area of local memory (0-500h)
PHASE 24
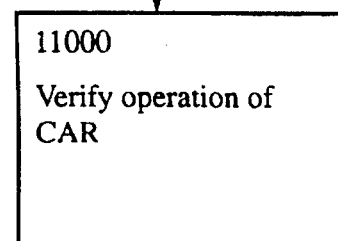
11000
Verify operation of CAR
PHASE 23
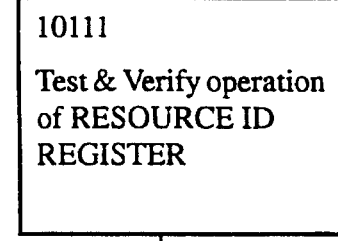
10111
Test & Verify operation of RESOURCE ID REGISTER
PHASE 22
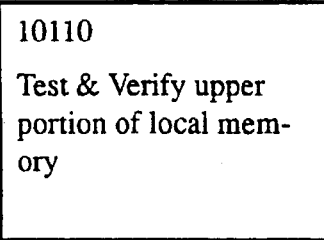
10110
Test & Verify upper portion of local memory
*Fig. 8b-2*

ON-BOARD DIAGNOSTIC TESTING

RELATED APPLICATIONS

This is a continuation of application Ser. No. 07/776,953 filed on Oct. 15, 1991 now abandoned.

1. The patent application of Thomas F. Joyce, James W. Keeley and Richard A. Lemay entitled, "Programmable Bus State Machine," filed on Oct. 4, 1991, bearing Ser. No. 07/771,297, now U.S. Pat. No. 5,341,495, which is assigned to the same assignee as this patent application.

2. The patent application of James W. Keeley, Richard A. Lemay, Chester M. Nibby, Jr., Keith L. Petry and Thomas S. Hirsch entitled, "Power Sequence System," filed on Oct. 15, 1991, bearing Ser. No. 07/775,864, now abandoned, which is assigned to the same assignee as this patent application.

BACKGROUND OF THE INVENTION

1. Field of Use

The present invention relates to data processing systems and, more specifically, to apparatus for testing such systems.

2. Prior Art

It is well known to provide special apparatus for verifying the operation of a data processing system. That is, certain systems include maintenance or auxiliary processing units for testing different systems during normal operation or during a test mode of operation. It is also well known to include an internal testing capability in the processing units of a system for establishing a certain level of operability.

The above arrangements tend to be quite complex or costly. Moreover, they do not provide the level of fault detection which is required for debugging a system or which can be used in a factory or repair facility environment. In such environments, tools, such as an in circuit emulator, are used to debug such systems or for determining failed board components.

The approach has been found to be costly and require that the personnel conducting such operations have some specific knowledge about the programming language(s) of the programs being executed during such testing. Additionally, since the connection of such emulators or similar test equipment are "intrusive," they can add timing delays which can make it more difficult to reliably ascertain the cause of the problem. This can become an acute problem where processing proceeds high speed, such as where the processing unit includes a high performance microprocessor chip as the main processing element.

Accordingly, it is a primary object of the present invention to provide testing apparatus and method which can reliably test a processing unit in a system and which also is usable in a factory test environment.

SUMMARY OF THE INVENTION

The above and other objects of the present invention are achieved in a preferred embodiment of a system which incorporates the apparatus and testing method of the present invention. A processing unit couples to a system bus and includes a microprocessor which tightly couples to a local memory. The processing unit also includes an addressable electrically erasable programmable read only memory (EEPROM) unit which couples to the microprocessor and to the system bus. The EEPROM unit stores in first and second separate regions, respectively, on-board diagnostic (OBD) routines and boot routines.

According to the present invention, the OBD routines are organized into a plurality of categories or phases. The processing unit includes a register accessible only by the microprocessor which, under the control of the OBD routines, is loaded with a number of predetermined values at the beginning of each OBD test routine for identifying a particular phase and subphase of testing to be performed. Each of the OBD routines is executed at microprocessor speed. In the preferred embodiment, the register also functions as a channel address register which is loaded by the processing unit with a channel number used for executing system bus operations.

Means coupled to the register directly connect to external circuits for displaying a first phase portion of the contents of the register for visually indicating which phase of testing a failure occurred. The phase and subphase contents of the register are used to identify the actual test which failed. This information provides an index into a test dictionary for determining the specific component or group of components which failed.

The arrangement of the present invention provides a low cost testing facility which enables testing to proceed at maximum speed in a manner which does not alter processing unit timing. By means of visual indicators and a test dictionary, faulty components in the processing unit can be quickly located and replaced by personnel having no specific knowledge of the characteristics of the software being executed.

The above and other objects of the present invention will be better understood from the following description when taken in connection with the accompanying drawings.

DETAILED DESCRIPTION OF THE PREFERRED EMBODIMENT

Figure 1:
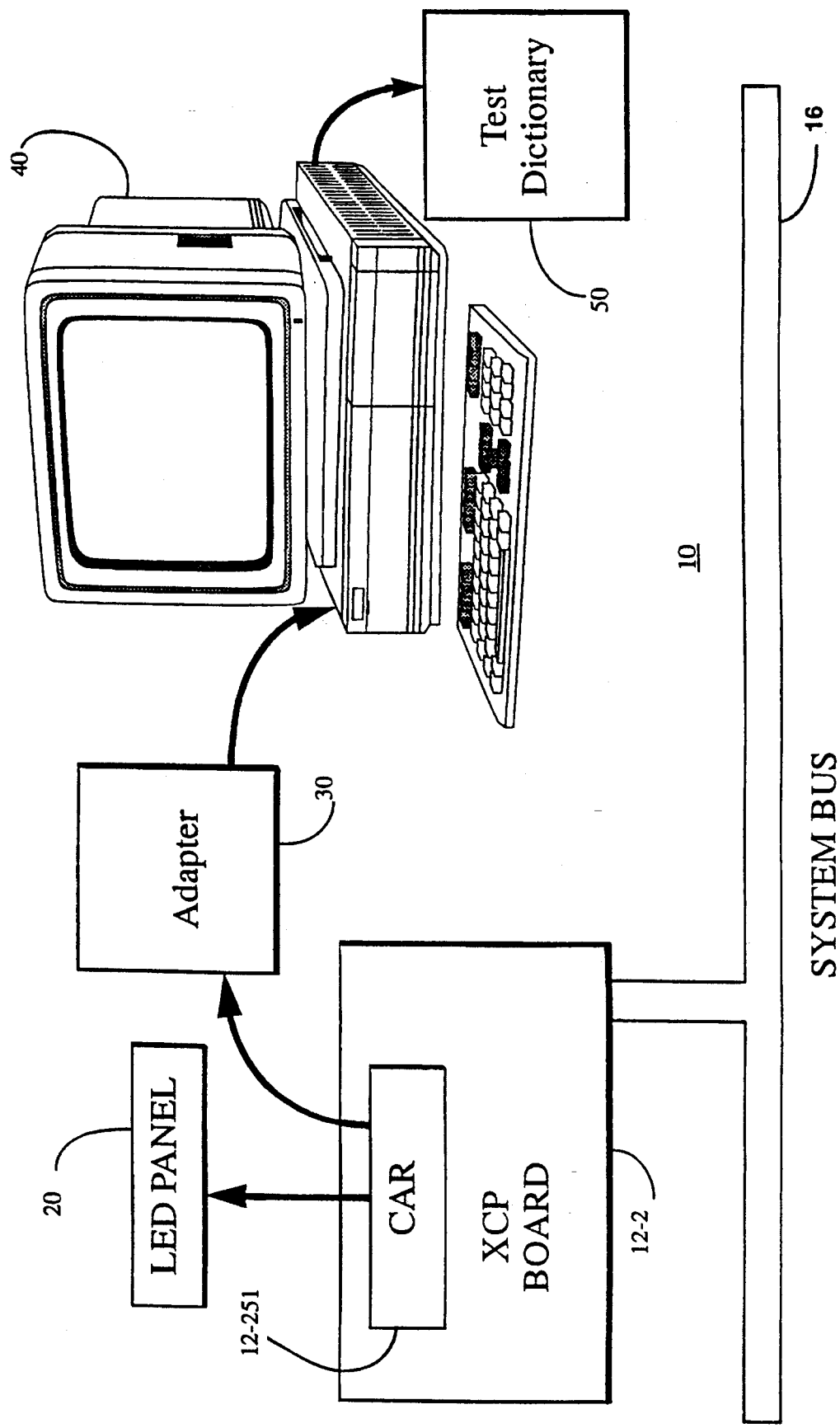
FIG. 1 is a block diagram of a processor of multiprocessor system which incorporates the method and apparatus of the present invention.

Description of FIG. 1

FIG. 1 shows in diagrammatic form, a portion of a system which utilizes the testing method and apparatus of the present invention. The system 10 includes a system bus 16 which connects in common a plurality of central processing units, not shown, and a number of peer processors, one of which corresponds processor 12-2 to a main memory. The processor 12-2 includes a bus interface area which enables the unit to transmit or receive requests in the form of commands, interrupts, data or responses/status to another unit on the bus 16. In the preferred embodiment, the system bus 16 operates asynchronously and uses a split bus cycle protocol. For further information regarding this type of bus interface and operation, reference may be made to U.S. Pat. No. 3,997,896.

According to the present invention, the processor 12-2 which is contained on a single board is connected to a display panel 20 for displaying test phase code information. The panel 20 includes a five light emitting diode (LED) elements which display a five bit binary code contained in a portion of the high order bit contents of an internal channel address register (CAR) accessible only by the processor's microprocessor, as described herein. The entire contents of the register are applied through appropriate adapter circuits 30 as an input to a conventional personal computer or analyzer equipment 40 for readout and display. This coded information is used to index into the contents of a test dictionary 50 stored within the personal computer or associated with the analyzer equipment. According to the present invention, the test dictionary includes descriptions of the faulty components for each of the on-board test (OBD) routines which are normally performed by the processor 12-2 as part of an initialization operation.

Figure 2:
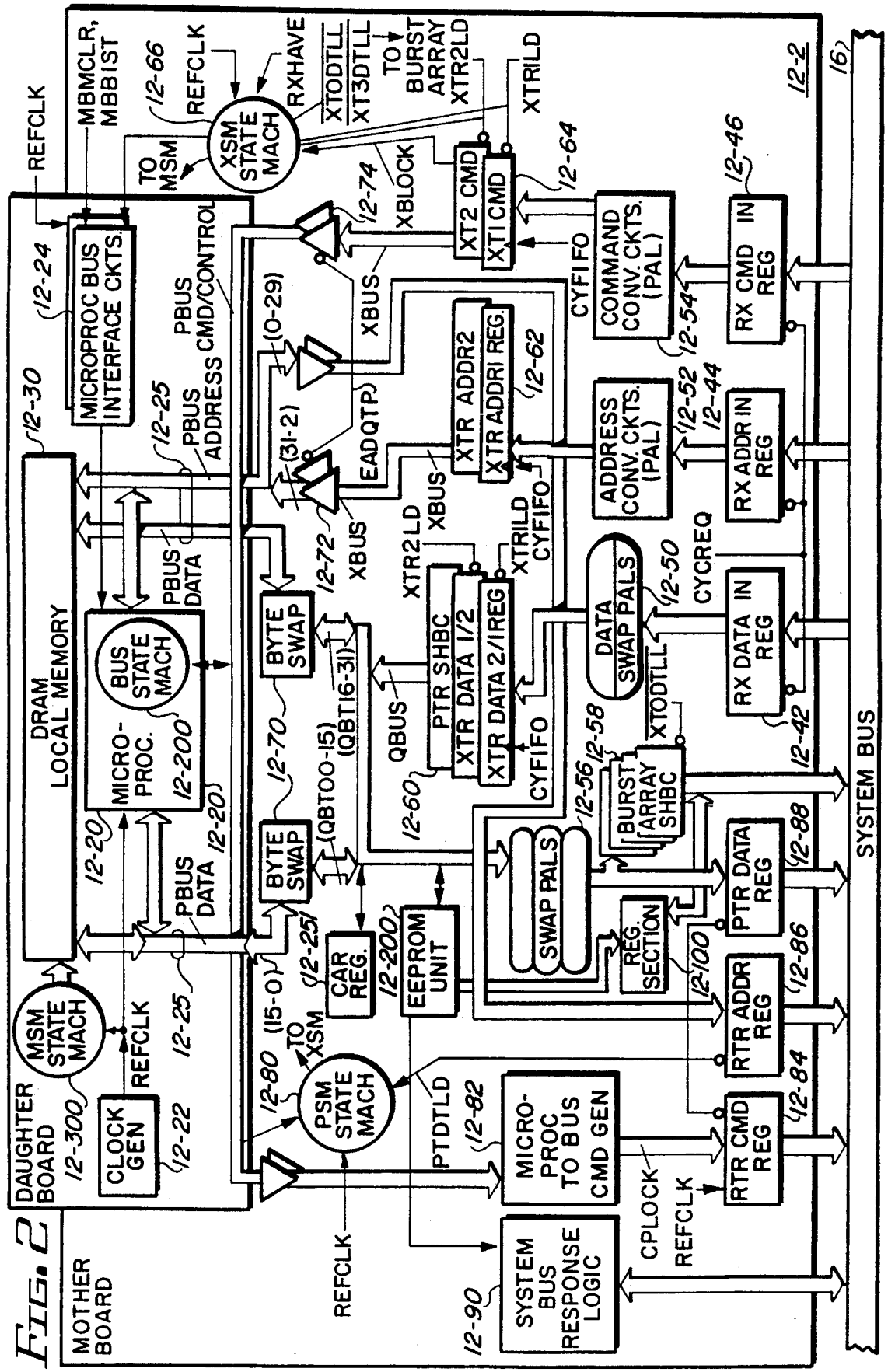
FIG. 2 shows in greater detail, the processing unit of FIG. 1.

Description of FIG. 2

FIG. 2 shows in greater detail, the processor 12-2 of FIG. 1. In the preferred embodiment, the microprocessor 12-20 and local memory 12-30, along with associated state machines 12-200 and 12-300, control circuits, in addition to clock generation circuits of block 12-22 are contained on a single daughter board, as shown. The clock generator circuits of block 12-22 generate a single frequency clock signal CLKREF of 33 MHz which provides the fundamental timing and internal operating frequency for microprocessor 12-20, in addition to all of the other circuits which make up processor 12-2. The system and bus interface circuits 12-24, input and output registers and state machines 12-80 and 12-66 are contained on the mother board. These two boards make up the entire processor.

In greater detail, the microprocessor 12-2 and local memory 12-30 are tightly coupled to the address, data and command/control processor bus lines of local bus 12-25, as shown. The circuits of block 12-24 serve as interface circuits which apply control signals to the microprocessor's bus interface which couples internally to the bus state machine 12-200. State machine 12-200 is used to control the microprocessor's access to local bus 12-25 by the generation of the proper bus protocol as a function of control signals generated by external state machine (XSM) 12-66. The XSM 12-66 controls the accessing of local memory 12-30, in response to external requests received from system bus 16.

As shown, the external requests received from system bus 16 are loaded into the receive data, address and command registers 12-42 through 12-46, in response to an enable signal CYCREQ generated by clock logic circuits, not shown. The address and command signals are converted into the appropriate form by address and command converter circuits of blocks 12-52 and 12-54 and stored in available registers of the two sets of queue registers of blocks 12-62 and 12-64. As shown, the registers of block 12-62 connect in common through tristate circuits to an output bus (X bus). Thereafter, the stored address and command signals are applied to the processor bus via the driver circuits of blocks 12-72 and 12-74, in response to an enabling signal EADQTP.

Any data associated with an external request loaded into register 12-42 is reordered as required by the programmable array logic (PALs) of block 12-50 and stored into the appropriate one of the registers of block 12-60 which connect in common to an output bus (Q bus) through tristate circuits. The different bytes of the data words are swapped from the so-called big endian format of the system bus to the little endian format utilized by microprocessor 12-20. This is accomplished by byte swap circuits of block 12-70 which is implemented by the proper reordering of connector pin connections.

The processor state machine (PSM) of block 12-80 controls the transfer and processing of transactions or requests initiated by microprocessor 12-20. As shown, commands generated by microprocessor 12-20 specifying an operation on system bus 16 are applied to a microprocessor to bus command generator of block 12-82 which, in turn, generates the appropriate system bus command. The bus command is loaded into a processor command register 12-84, along with the appropriate address and data. The address and data are loaded into registers 12-86 and 12-88, respectively, via an address bus and the Q data bus as shown in FIG. 2. This is all done in response to an enabling load signal PTDTLD generated by the PSM state machine 12-80 of control signals applied as an input to generator 12-82 and to the system bus response circuits of block 12-90.

Additionally, the PSM 12-80 processes internal I/O requests initiated by microprocessor 12-20 for reading/writing different ones of a number of internal registers 12-68 connected to the Q bus. These registers include the channel address register (CAR) and a physical address register (PAR). As described herein, the CAR register performs a dual function of storing channel number information transmitted to system bus 16 as part of an I/O command during normal I/O operations and as part of the testing apparatus of the present invention. The PAR register is used to store transaction address information. These registers are described in greater detail in the Glossary.

Also, as seen from FIG. 2, the processing unit 12-2 further includes a register section 12-100 which is part of a separate interface. This section contains a plurality of system visible registers and is shown in greater detail in FIGS. 3a and 3b.

Figure 3A:
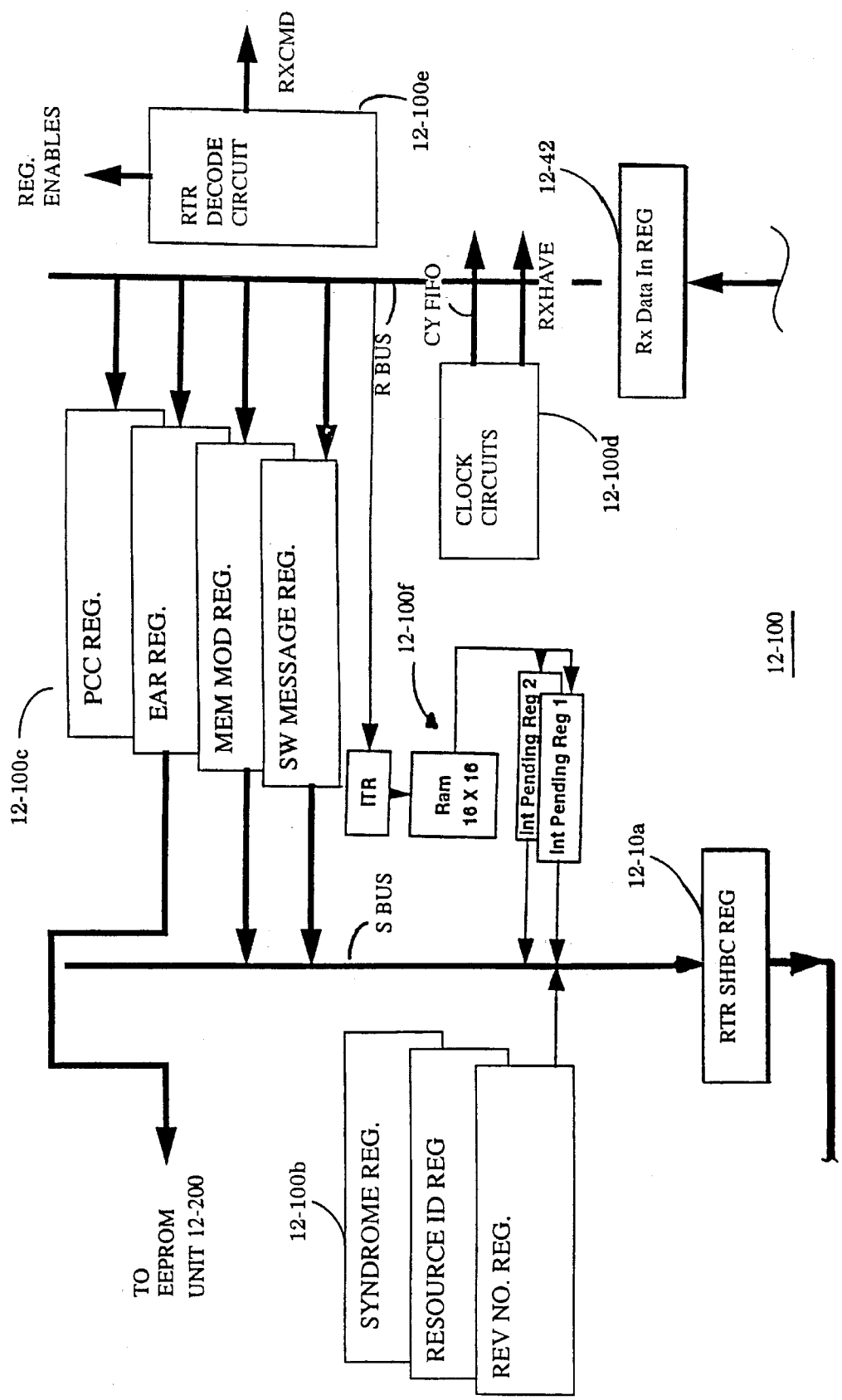
FIGS. 3a through 3c show in greater detail, the EEPROM unit of FIG. 2.

According to the present invention, processing unit 12-2 further includes an electrically erasable programmable read only memory (EEPROM) unit 12-200. This unit includes an EEPROM memory section 12-210 and an EEPROM control section 12-250 which are shown in greater detail in FIGS. 3b and 3c. As described herein, the EEPROM unit 12-200 is organized as two 64 kilobyte regions both of which occupy the last 64 kilobytes of the 4 gigabyte address space of microprocessor 12-20. It is addressable from system bus 16 through register section 12-100 which includes an external EEPROM address register as shown in FIG. 3a. It also couples to the Q bus which is used to transmit and receive data bytes from system bus 16, in addition to providing read access by microprocessor 12-20.

As shown, the EEPROM control section 12-250 provides an EEPROM busy output signal EEBUSY as an input to system bus response logic of block 12-90. This enables the writing of the EEPROM section 12-210 to take place without interference as explained herein.

Figure 3B:
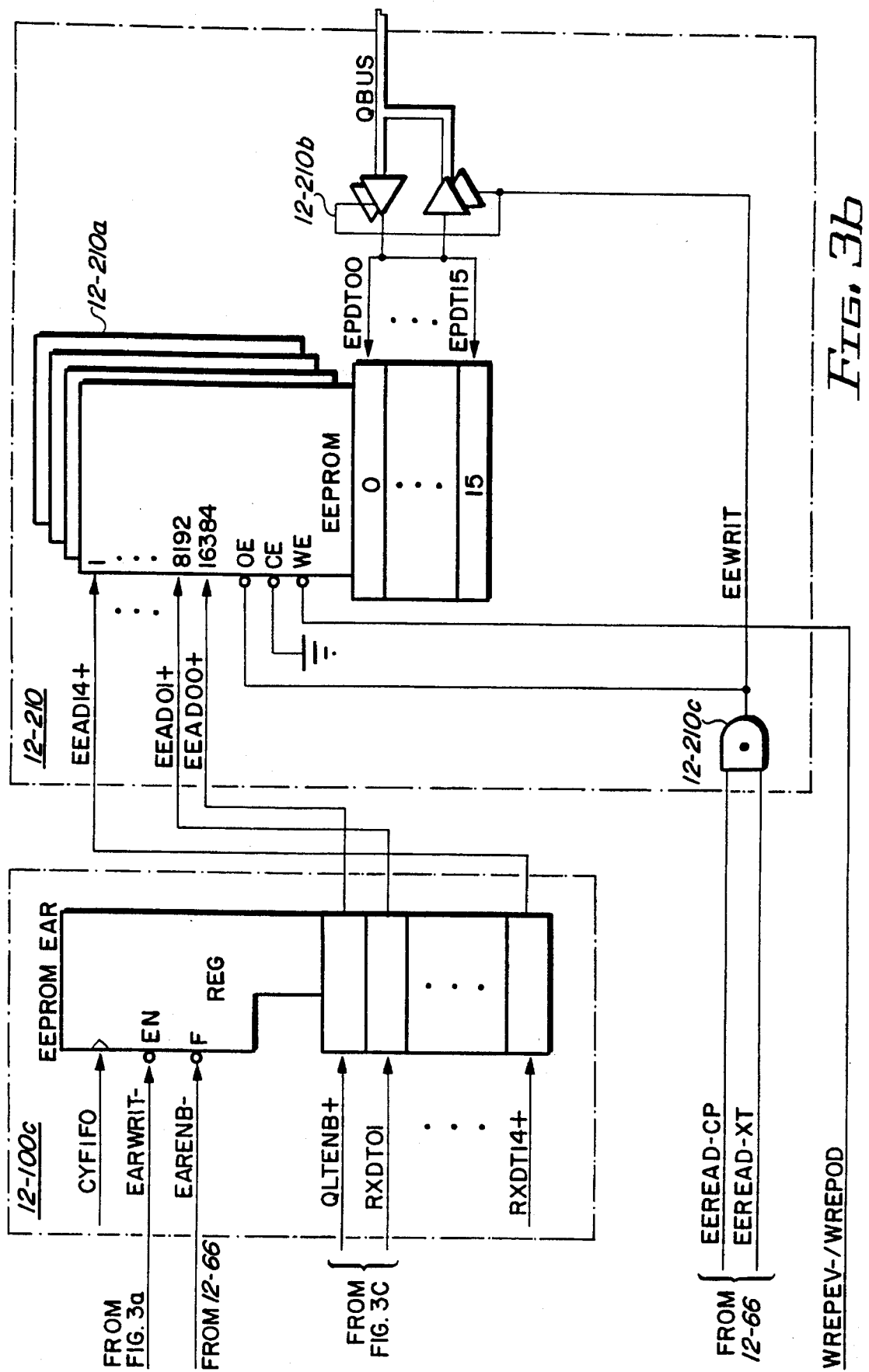
Figure 3C:
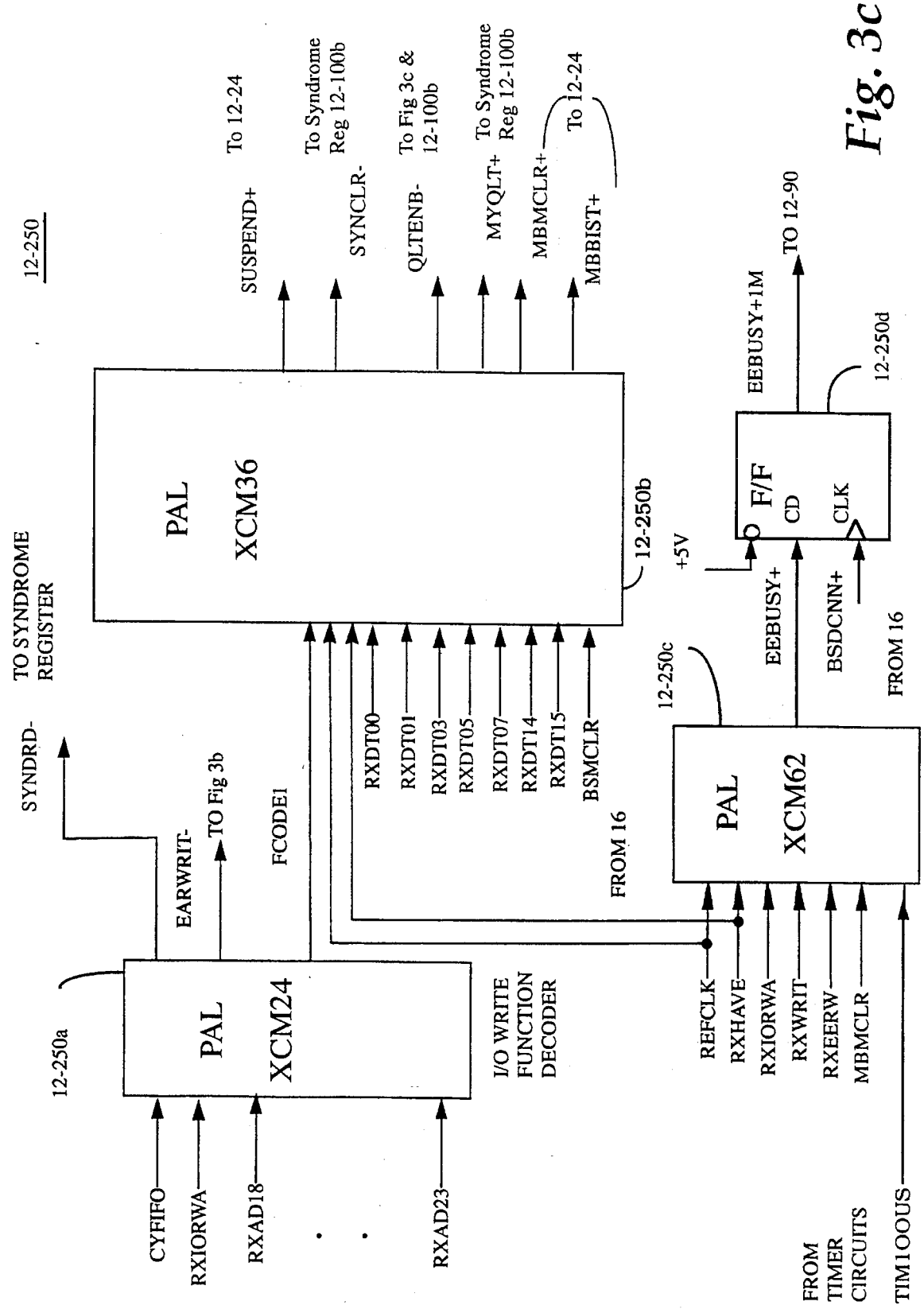

Description of FIGS. 3a through 3c

FIG. 3a shows in greater detail, the system visible registers and associated control circuits of register section 12-100. The processing unit 12-2 further includes a plurality of system visible registers which are accessible via system bus 16 by microprocessor 12-20 or by any other system bus unit. A number of these registers connect in common to a receive bus (R Bus), as shown, for receiving input data from the RX DATA IN register 12-42.

These registers include a processor control command register (PCC) which comprises a plurality of flip-flop register stages, an EEPROM address register (EAR), a memory module register (MMR), a software message register (SMR), a pair of interrupt pending registers (IPR0 and IPR1) which serve as the output registers of an interrupt store (IPS), and random access memory (RAM), loadable from the R Bus by an interrupt register (ITR). As shown, the SMR, MMR, IPR0 and IPR1 registers also connect in common to a send bus (S Bus) for reading out of their contents to system bus 16 via a receive transfer second half bus cycle register (RTSHBC) 12-70.

Other system visible registers whose contents are only read, also connect in common to the S Bus. These registers include a syndrome register (SYN), a resource identification register (ID) and a revision number register (REV). The ID and REV registers which store constant values in addition to the MMR register are implemented in a programmable array logic (PAL) circuit while the other registers are implemented using standard register circuits.

The system visible registers are accessed in response to I/O commands applied to system bus 16 which results in the storing of address and command signal in registers 12-44 and 12-46. The address and command signals are decoded by the decode circuits of the RTR Control block 12-90. The system visible registers are described in greater detail in the Glossary.

FIG. 3b shows in greater detail, the external EEPROM register 12-100c and the EEPROM memory section 12-210. As shown, register 12-100c receives FIFO clock signal CYFIFO from clock circuits 12-100d of FIG. 3a, a write control signal EARWRIT–, and an enable signal EARENB– from the EEPROM control section 12-250. Control signal QLTENB+ is applied to the most significant address bit position of register 12-100c. The remaining address bit positions receive signals RXDT01+ through RXDT14+ from system bus 16 through RX DATA IN register 12-42. The output contents of EAR register 12-100c in response to signal EARENB– are applied as signals EEAD00+ through EEAD14+ to the address input terminals of a plurality of EEPROM chip circuits 12-210a of EEPROM memory section 12-210. Additionally, the circuits 12-250a receive an output enable signal EEWRIT from an AND gate 12-210c. This AND gate is enabled in the absence of an EEPROM read signal EEREAD-CP or EEREAD-XT from either PSM 12-80 or XSM 12-66. Additionally, XSM 12-66 provides write enable signals WREPEV– and WREPOD as shown.

The input/output data terminals of EEPROM circuits 12-210a connect to the Q bus through bidirectional driver circuits of block 12-210b as shown transmit and receive signals EPDT00 through EPDT15. The driver circuits of block 12-210a are enabled by the state of signal EEWRIT.

FIG. 3c shows in greater detail, the EEPROM control circuits 12-250a through 12-250d of EEPROM control section 12-250. As seen from FIG. 3c, these circuits include programmable array logic (PAL) circuits 12-250a through 12-250c and D-type flip-flop 12-250d. The PAL circuit 12-250a receives signal CYFIFO from clock circuits 12-100d of FIG. 3a and I/O read/write acknowledge signal RXIORWA+ and address signals RXAD18 through RXAD23 from the registers 12-44 and 12-46. PAL circuit 12-250a decodes these signals and generates as outputs, function code 1 signal FCODE1+, syndrome register signal SYNDRD– and EAR register write signal EARWRIT–.

The PAL circuit 12-250b receives clock reference signal REFCLK, signal RXHAVE from the clock circuits 12-100d of FIG. 3a, data signals RXDT00+ through RXDT15+ from register 12-42 in addition to system master clear signal BSMCLR– from system bus 16. In response to these signals, in addition to the signal FCODE1, PAL circuit 12-250b generates as outputs, suspend operation signal SUSPEND, syndrome register clear signal SYNCLR–, QLT enable signal QLTENB–, my QLT signal MYQLT+, bus master clear signal MBMCLR+ and bus built-in self-test signal MBBIST+. The signals SUSPEND+, MBMCLR+, and MBBIST+ are applied as inputs to the bus control circuits of block 12-24 of FIG. 2. The signals SYNCLR+, MYQLT+ and QLTENB– are applied as inputs to the syndrome register included in block 12-100b of FIG. 3a. Additionally, signal QLTENB– is applied as an input to the EAR register of FIG. 3b.

The PAL circuit 12-250c receives as inputs, clock reference signal REFCLK from clock generator 12-22, signal RXHAVE from clock circuits 12-100d, signal RXIORWA+, write signal RXWRIT from bus 16, EEPROM read/write signal RXEERW+ from bus 16, bus master clear signal MBMCLR+ from bus 16 and a one hundred microsecond timer signal TIM100US from conventional timer circuits included within PSM 12-80. PAL circuit 12-250c generates EEPROM busy signal EEBUSY+ which is stored in flip-flop 12-250d in response to bus data cycle now signal BSDCNN+ from bus 16. The flip-flop 12-250d applies output EEPROM busy signal EEBUSY+1M to the bus response circuits of block 12-90 of FIG. 2. For further information regarding the equations and descriptions of the PAL circuits of FIG. 3c, reference may be made to the referenced related patent application entitled, "Power Sequence System".

Figures 1, 3D:
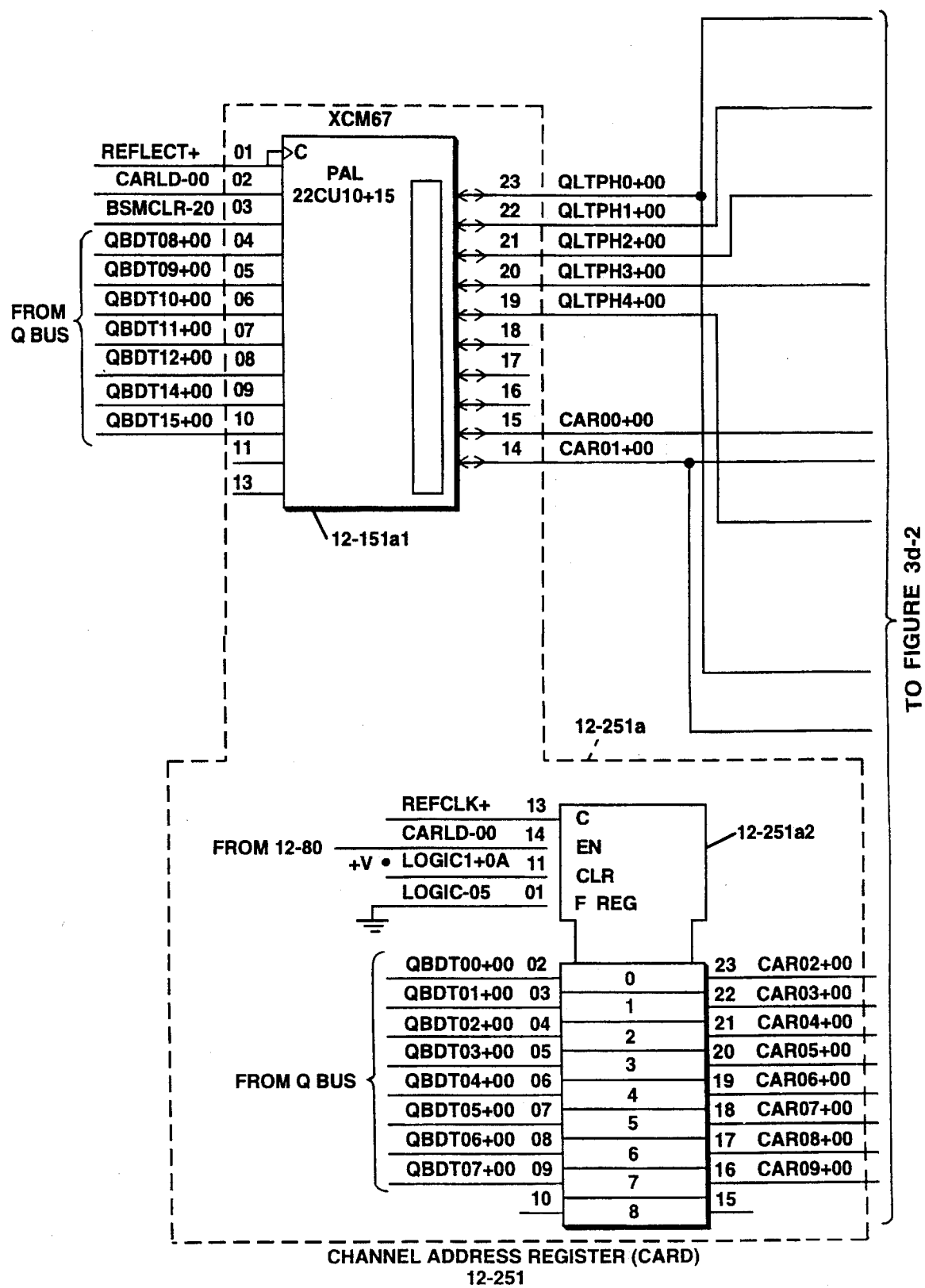
FIG. 3d shows in greater detail, the register and indicator apparatus of FIG. 1 constructed according to the present invention.
Figures 2, 3D:
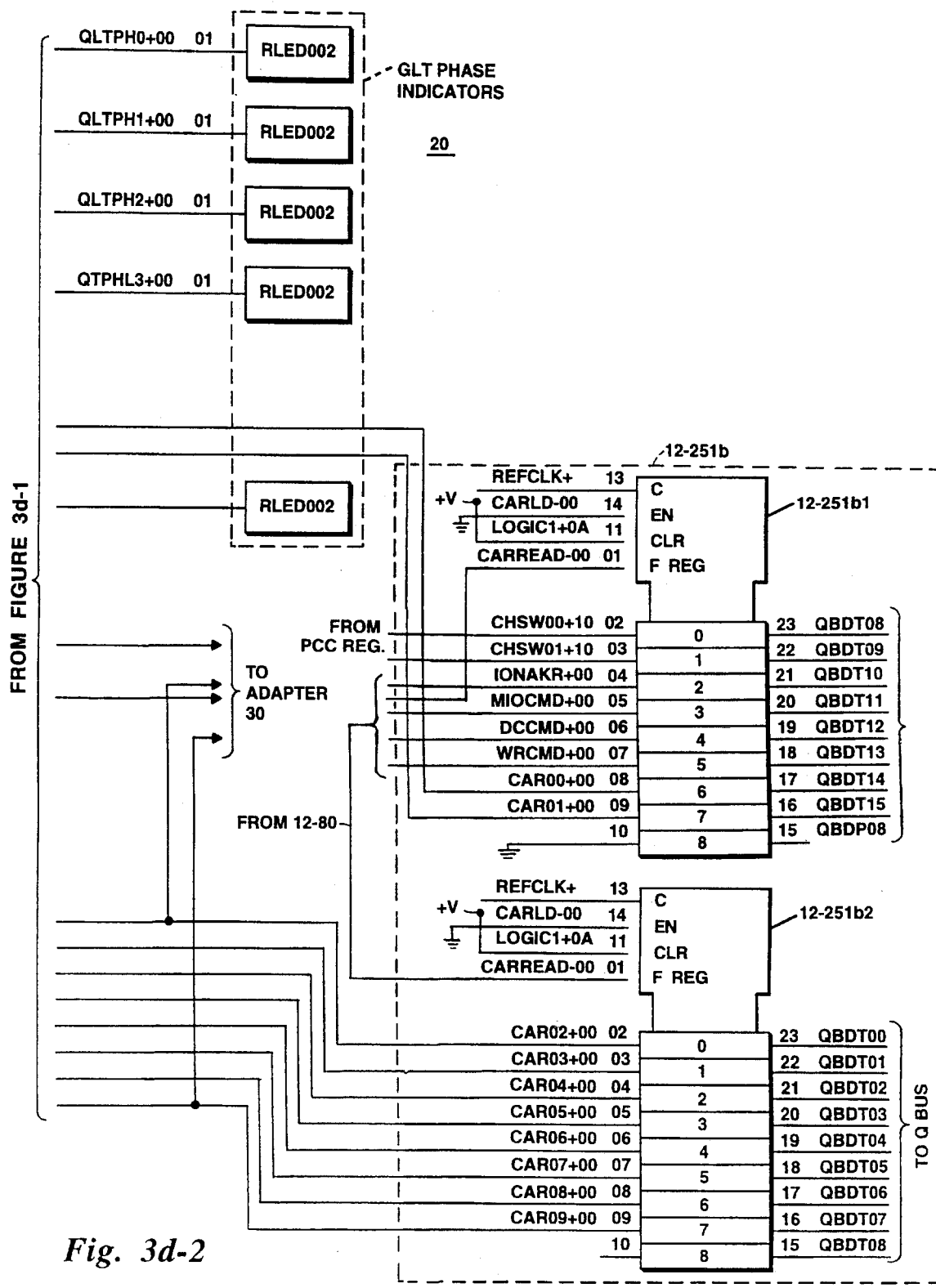

Description of FIG. 3d

FIG. 3d shows in greater detail, the channel address register 12-251, constructed according to the present invention. The register 12-251 has two separate sections, a write section 12-251a and a read or output section 12-251b. The write section 12-251a includes a programmable array logic (PAL) circuit 12-251a1 and a register circuit 12-251a2. Both circuits are connected to receive sixteen bit data signals QBDT00+ through QBD15+ from microprocessor 12-20 which have been byte shifted onto the Q bus by the circuits 12-70 of FIG. 2. The PAL circuit 12-251a1 receives system bus master clear signal BSMCLR– and a register load signal CARLD– from PSM 12-80. This signal is generated in response to a write I/O command issued by microprocessor 12-20 having a function code of "41" designating CAR register 12-251. The PAL circuit 12-251a1 is clocked to operate at microprocessor speed by reference clock signal REFCLK+. As shown, PAL circuit 12-251a1 includes storage register circuits. These circuits produce as outputs, the five-bit phase coded signals QLTPH0+ through QLTPH4+ and channel number signals CAR00+ and CAR01+.

The phase coded signals QLTPH0+ through QLTPH4+ are applied directly to the LED indicator circuits of display panel 20. The channel number signals CAR00+ and CAR01+ are applied as inputs to receive output section 12-251*b*. Register circuit 12-251*a*2 also receives register load signal CARLD– from PSM 12-80. The register contents of circuits 12-251*a*1 and 12-251*a*2 are applied as inputs to adapter 30.

The read register section 12-251*b* includes register circuits 12-251*b*1 and 12-251*b*2 which connect to PAL circuit 12-251*a*1 and register circuit 12-251*a*2, as shown. Both of these register circuits receive reference clock signal REFCLK+ and register read signal CARREAD– from PSM 12-80. The signal CARREAD– is generated in response to a read I/O command issued by microprocessor 12-20 having a function code of "41" designating CAR register 12-251. This applies the contents of these registers onto the Q bus. In addition to the channel number signals, register circuit 12-251*b*1 also receives as inputs, signals CHSW00+ and CHSW1+1 from the PCC register of section 12-100, I/O negative acknowledgement signal IONAKR, IO command signal MIOCMD+, D/C command signal DCCMD+ and read/write command signal WRCMD+ from PSM 12-80. These signals are derived from decoding commands issued by microprocessor 12-20. For further information regarding these signals, reference may be made to the referenced related patent applications and to the Glossary which contains the equations for PAL circuit 12-251*a*1.

Figure 4:
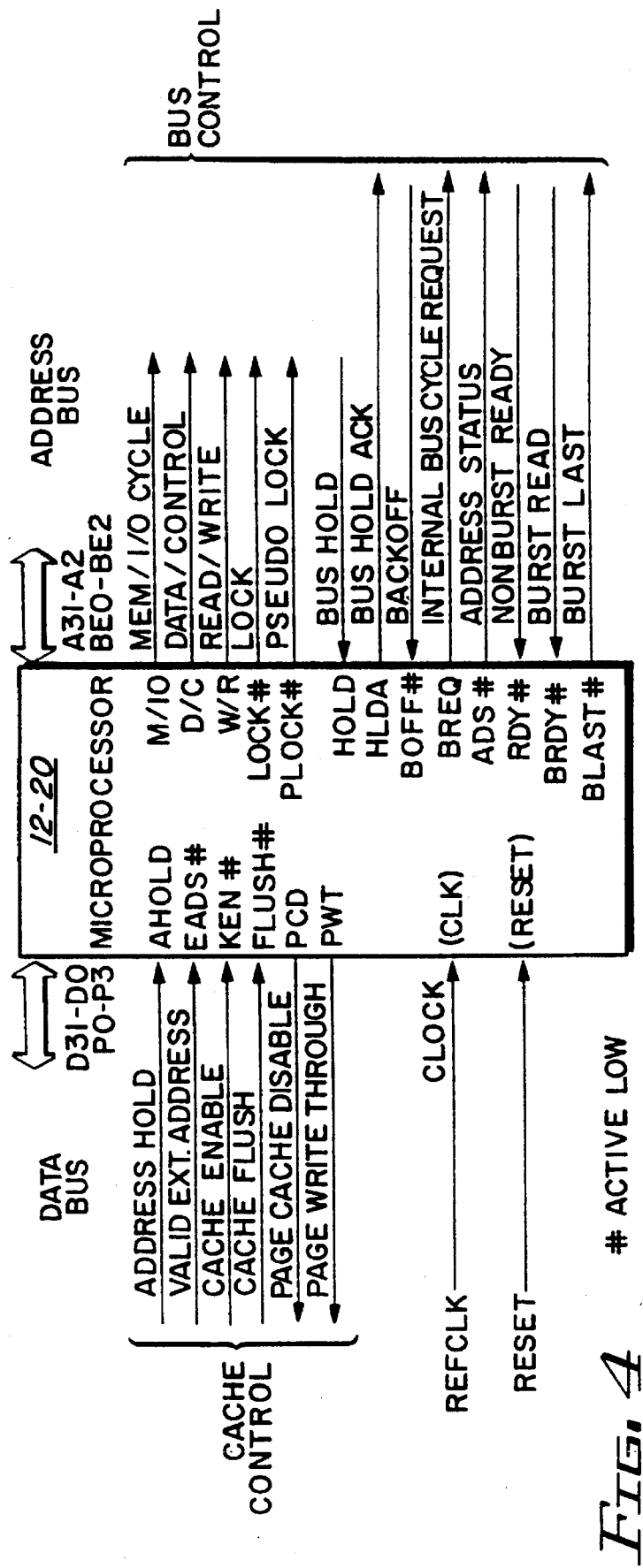
FIG. 4 shows in block form, the microprocessor of FIG. 2.

Description of FIG. 4

FIG. 4 shows in greater detail, the microprocessor 12-20 and the different interface signals. The interfaces are divided into sections which denote the different functions which do not necessarily correspond with the physical layout of the Intel 80486 chip. The address bus and bus control lines comprise the majority of the lines. The address lines are bidirectional for accommodating the cache bus snooping capability. The cache control section includes six pins for controlling the microprocessor's internal cache. The cache enable (KEN) input is most frequently used to disable areas of memory that cannot be cached.

The address hold (AHOLD) and external address strobe (EADS) inputs allow an external device to present the microprocessor 12-20 with an address. If the address matches an address in the microprocessor's internal cache, the associated data is flagged as invalid. The flush (FLUSH) cache input is used to inform the microprocessor that the entire contents of its cache are invalid. The page writethrough (PWT) and page cache-disable (PCD) output pins reflect the states of the page attribute bit settings in internal page table entry or page directory entry registers. They indicate caching control that software has exerted over logical memory pages.

The bus control section includes thirteen pins for controlling the processor's bus under the microprocessor's bus control state machine. The bus request (BREQ) output signal indicates that the microprocessor needs the address/data bus. The back off input (BOFF) enables an external device to take control of the entire address/data bus even within an active, yet incomplete cycle. The pseudo lock output signal (PLOCK) is used by the microprocessor to indicate that the transaction it is performing requires more than one bus cycle to complete. By contrast, the bus lock signal (LOCK) is used to signal a critical read-modify-write operation in which no other system element can examine the item being modified until the current operation is complete. The microprocessor will not allow a bus hold request (HOLD) to take place wherein another bus master can complete control of the bus. That is, the microprocessor will not generate a hold acknowledge signal (HLDA), in response to a bus hold request.

The memory/input-output (M/IO), data/control (D/C), and write/read (W/R) signals are used to define the type of bus cycle being initiated. The address status output signal (ADS) indicates when these bus cycle definition signals and address signals are valid. The non-burst ready input signal (RDY) indicates that the current bus cycle is complete. The burst ready input signal (BRDY) and the burst last signal (BLAST) are used to carry out burst transfer operations.

The burst ready signal indicates that the current cycle is complete and the system will continue data transfer in the next clock cycle, unless the signal BLAST is presented. The BLAST signal signifies that the burst transfer is complete.

The non-maskable interrupt request signal indicates when an external non-maskable interrupt has been generated. The NMI signal must be held in a low state for at least four clock periods before rising in order to be properly detected during a particular clock cycle.

For further information regarding the use of these signals, reference may be made to the Intel publication entitled, "i486 MICROPROCESSOR," dated November, 1989, Order Number: 240440-002.

The RESET input forces microprocessor 12-20 to a known state. The microprocessor 12-20 includes a built-in self-test capability (BIST) which tests its non-random logic, control ROM, translation lookaside buffer (TLB) and on-chip cache memory. The BIST is initiated by holding the AHOLD input high in the clock signal prior to the RESET input being switched from a high to low state. The BIST takes approximately 32 milliseconds to complete. The results of the BIST are stored in an internal register and have a value of ZERO when successfully completed.

DESCRIPTION OF OPERATION

Figure 5:
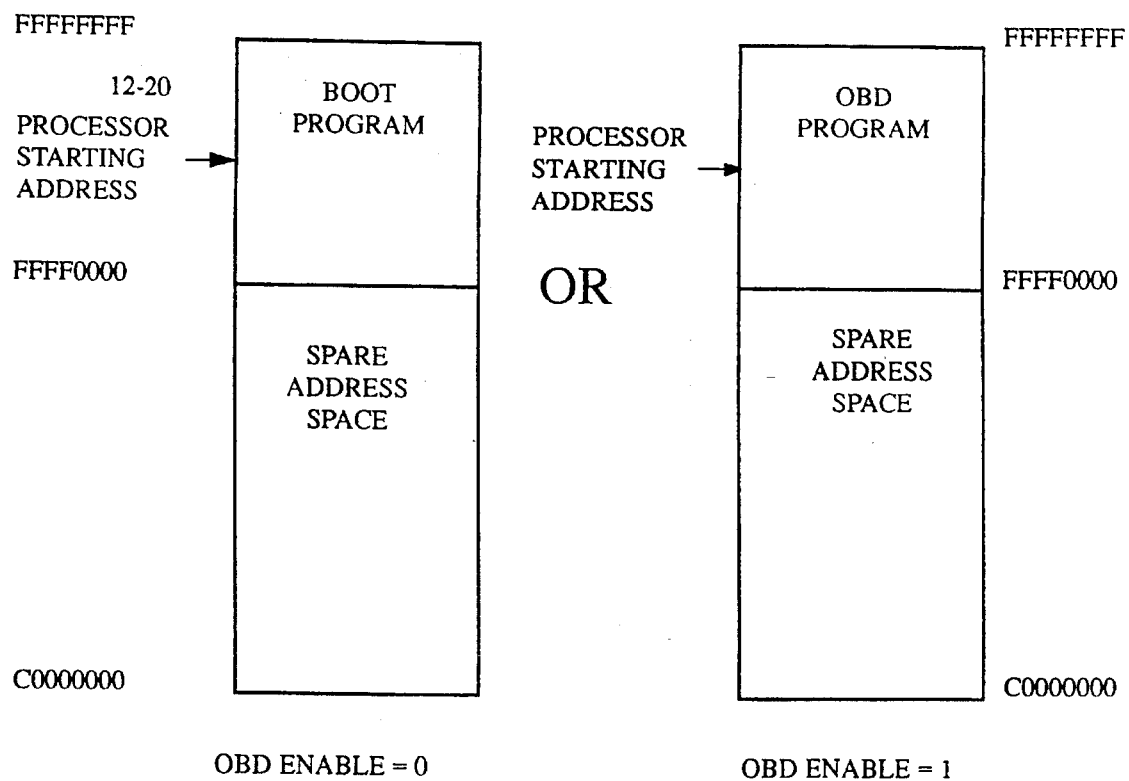
FIG. 5 shows the mapping of processing unit's private memory address space as a function of the state of address bit signal EEADOO+ which corresponds to the state of signal QLTENB+ generated by PAL circuit 12-250b of FIG. 3c.

With reference to FIGS. 1 through 4, the method and apparatus will now be described with reference to FIGS. 5 through 8. FIG. 5 illustrates the mapping of processing unit's private memory address space as a function of the state of address bit signal EEADOO+ which corresponds to the state of signal QLTENB+ generated by PAL circuit 12-250*b* of FIG. 3*c*. As shown, when signal QLTENB+ is a binary ONE as is the case when power is applied to the system, microprocessor 12-20 which is normally forced to a single starting address of FFFFFFF0 will execute instructions of the on-board diagnostic routines. However, when signal QLTENB+ is forced to a binary ZERO, microprocessor 12-20 will execute instructions of the boot routine. It is seen that these routines are overlayed and use the address space normally referenced by microprocessor 12-20. Hence, since microprocessor 12-20 always starts execution from the same starting address, the state of signal QLTENB+ determines which image or region will be used by the microprocessor.

Figure 6:
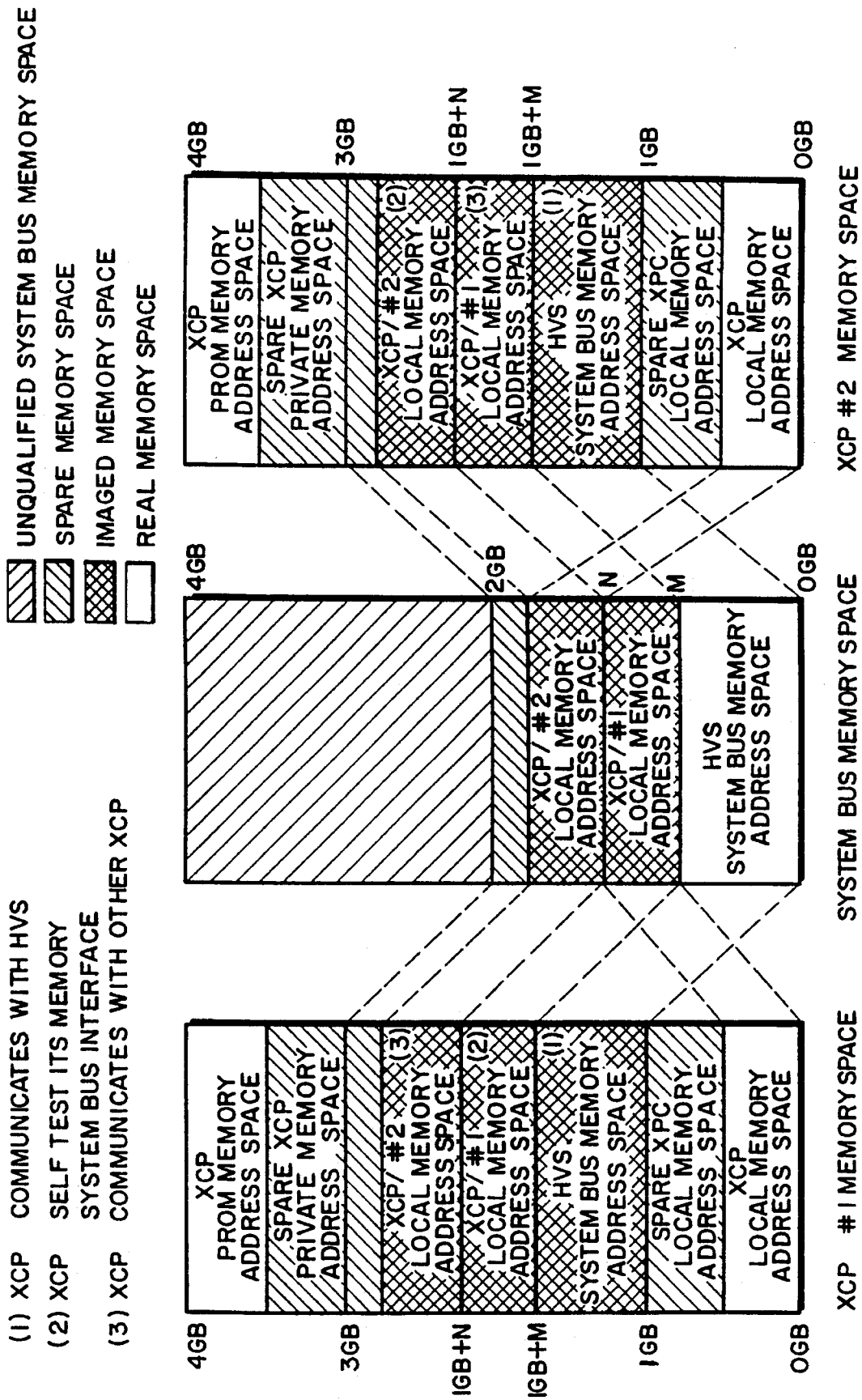
FIG. 6 shows the address space of the system of FIG. 1.

FIG. 6 illustrates the address space of the system of FIG. 1. The usable HVS system address space is a 2 gigabyte addressable memory block which starts at location 0. This block contains the system real memory and images of the XCP microprocessor 12-20 memory. The XCP microprocessor address space is a 4 gigabyte memory block which includes the following three areas: (1) the first gigabyte memory area is reserved for the XCP microprocessor onboard (local) memory 12-30, (2) the second and third gigabyte memory areas are reserved for the system bus 16; and (3) the fourth gigabyte memory area is reserved for the XCP microprocessor private memory of FIG. 5.

The starting addresses of M or N of the XCP microprocessor image is assigned by the HVS operating system using the processing unit 12-2 memory module register of FIG. 3a. That is, when the HVS operating system addresses location M on the system bus 16, XCP processing unit 12-2 (e.g. #1) addresses location 0 in its address space. When XCP processing unit 12-2 (#1) addresses location 0 in its address space, it will again respond by accessing the same location 0 which the HVS operating system just accessed. When the XCP processing unit 12-2 (#1) addresses location 1GB+M in its address space, this is translated into system bus address M and then returned back to processing unit 12-2 causing it to again respond by accessing location 0 in its address space. This wrapping operation is required to be used in order to perform system bus testing during the execution of the on-board diagnostic routines.

During a power on sequence or when the signal QLTENB− is set to a binary ONE in response to a master clear operation, the memory module register of processing unit 12-2 is preloaded with a system bus address having a value of 2 gigabytes. This places XCP local memory addressing outside the addressable range supported by system bus 16. This prevents interference from peer processors operating under the control of the HVS operating system.

During the execution of the on-board diagnostic routines, a different address value is loaded into the memory module register of each XCP processing unit. This value is calculated by microprocessor 12-20 from the assigned channel number value. The assignment of different images to the XCP processing units of FIG. 1 allows each processing unit to execute the system bus test routine portion of the on-board diagnostic routines stored in its EEPROM unit without interference from each other.

The apparatus of the present invention enables the processing unit 12-2 to be tested in parallel with the remainder of the system prior to loading the HVS operating system. The preloading of the memory module register of processing unit 12-2 enables the unit to perform complete internal testing independent of the remainder of the system, including testing of its capability to perform system bus operations.

Figure 7A:
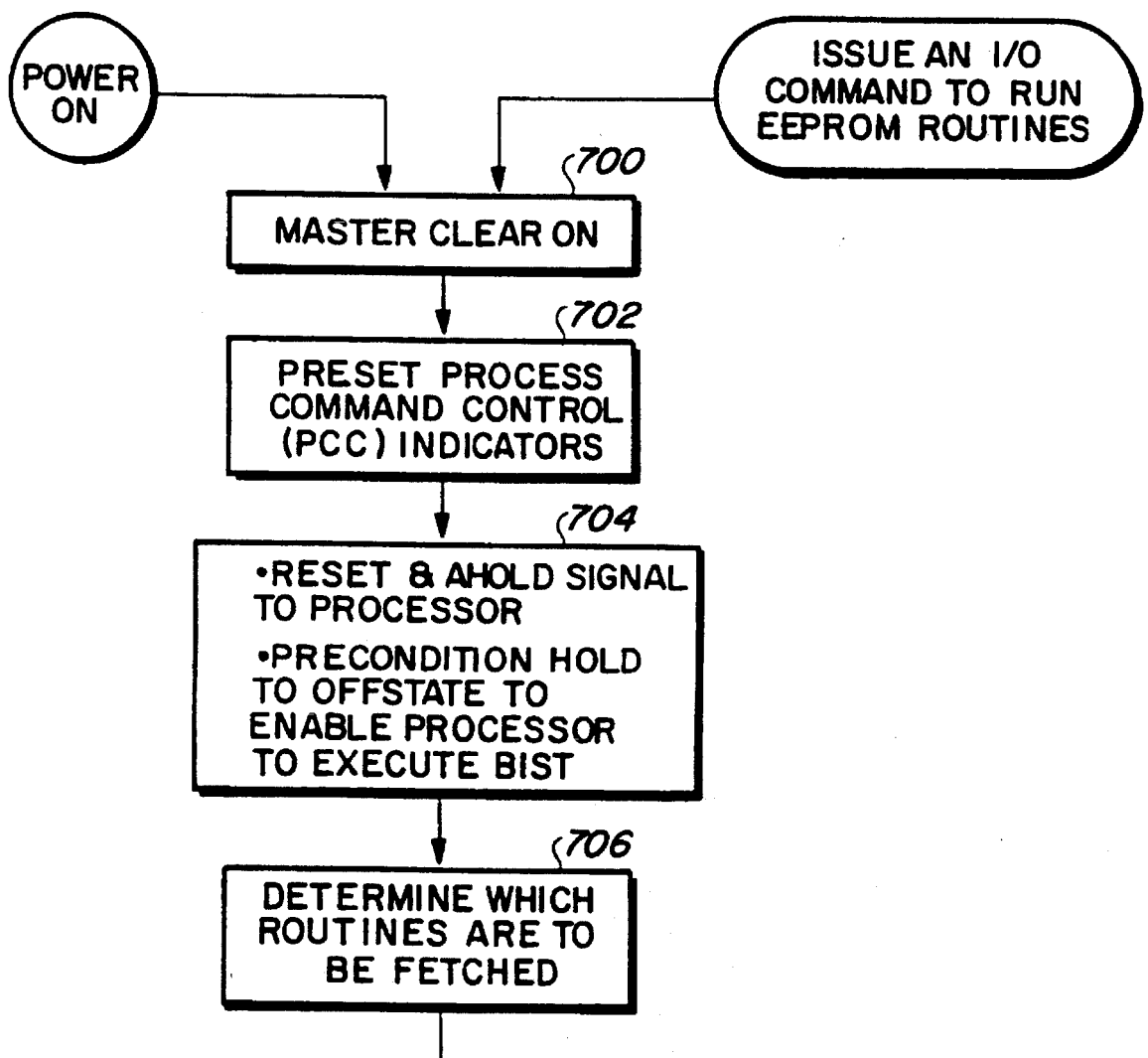
FIG. 7 shows the manner in which processing unit 12-2 performs such internal testing using the apparatus of the present invention.
Figure 7B:
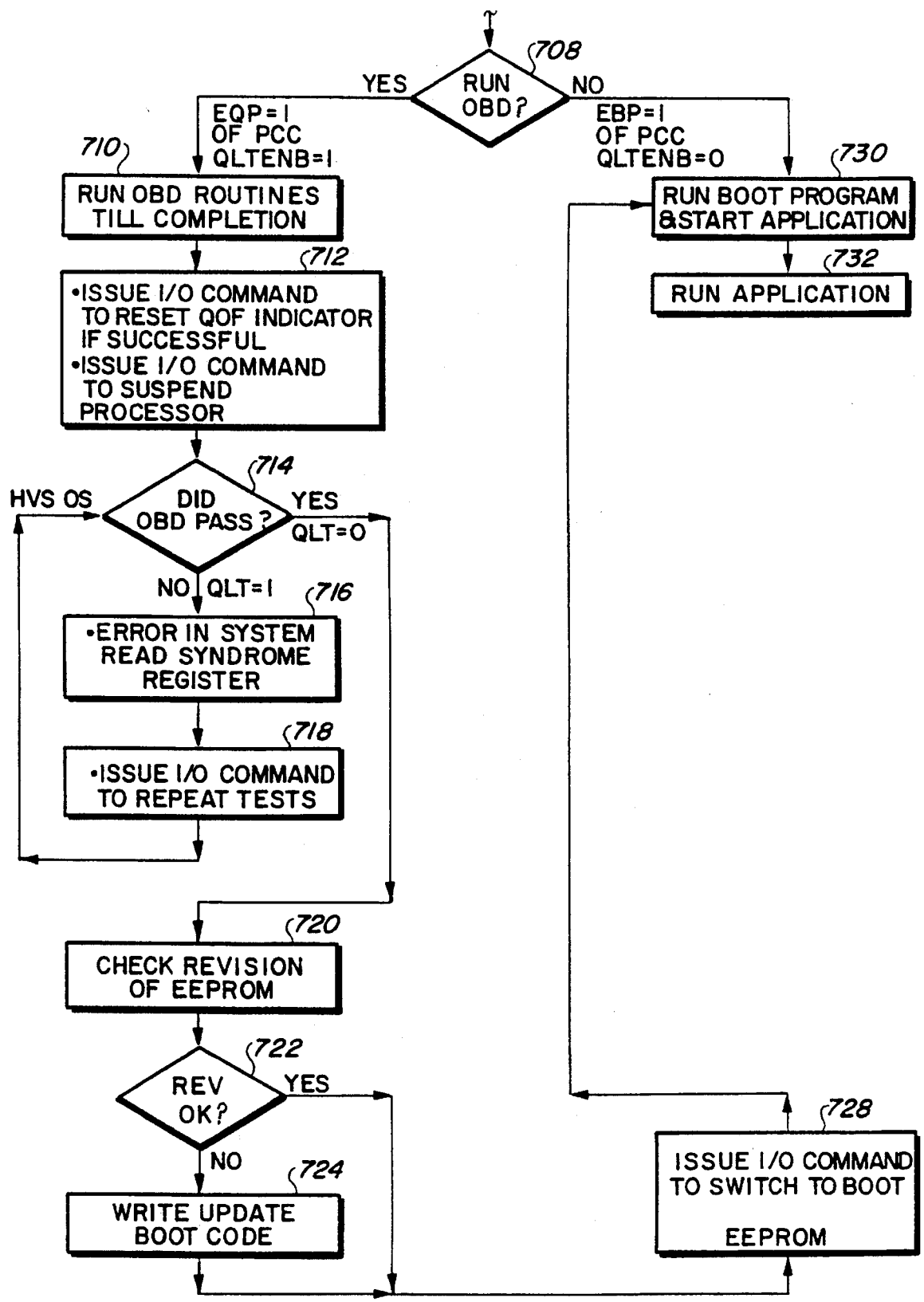

Description of FIG. 7

FIG. 7 illustrates the manner in which processing unit 12-2 performs such internal testing using the apparatus of the present invention. Referring to the Figure, it is seen that in response to a power on condition, the system issues a master clear signal in block 700. This results in signal BSMCLR− being forced low. This results in the presetting of certain processor command signals. That is, the EEPROM control section PAL circuit 12-250b of FIG. 3c operates to force signals SUSPEND+, MBBIST+, MYQLT+, QLTENB−, MBMCLR+ and SYNCLR− to the appropriate states.

The signals SUSPEND+, MBBIST+ and MBMCLR+ are applied to the bus control circuits 12-24 of FIG. 2. This results in application of a reset signal to the reset terminal of microprocessor 12-20 of FIG. 4, along with a signal to the AHOLD input terminal. Also, the HOLD input terminal is held in the off state. As seen from block 704, microprocessor 12-20 is conditioned to execute its BIST self-test routines.

This verifies that the microprocessor 12-20 is operating properly. Next, as indicated by block 706, processing unit 12-2 determines which routines are to be fetched from EEPROM unit 12-200. As previously discussed, the state of signal QLTENB− generated by PAL circuit 12-250b determines which 64k byte region or section of EEPROM memory section 12-210 will be addressed. Since the sequence of operation occurred in response to a power on operation, signal QLTENB− which is a binary ONE causes microprocessor 12-20 to run the on-board diagnostic (OBD) routines to completion as indicated in block 710.

Upon the completion of the OBD routines, the microprocessor 12-20 suspends its operation as indicated by block 712. This is done when the microprocessor 12-20 issues an I/O command specifying itself by designating its own channel number. The I/O command is coded to specify an "001" code for the M/IO, D/C and W/R fields which cause the microprocessor 12-20 to place itself in a halt condition. At this time, the HVS operating system software which will have been loaded into the system takes over and performs the operations of blocks 714 through 728.

It can be seen that the apparatus of the present invention provides a substantial amount of flexibility in determining what steps should be taken by the operating system. First, the HVS operating system determines if the microprocessor 12-20 successfully completed the OBD routines. This is determined by examining the state of certain ones of the indicator bits contained in the syndrome register 12-100c of FIG. 3a. When the states of these bits indicate that there were no errors, the HVS operating system then checks the revision number of the boot code to ensure that it is up to date.

This is done by issuing I/O commands which specifies reading the contents of the EEPROM unit 12-200. When the revision is not up to date, as determined by block 722, then the HVS operating system issues an I/O command specifying the writing of the EEPROM boot routine contents. The command upon being decoded causes the XSM 12-66 to generate the appropriate write signals which results in forcing signals WREPEV− and WREPOD− to binary ZEROS. Also, the PAL circuit 12-250c of FIG. 3c, in response to the EEPROM write command, forces EEPROM busy signal EEBUSY to a binary ONE state. This switches flip-flop 12-250d to a binary ONE state upon the occurrence of bus data cycle now signal BSDCNN. Flip-flop 12-250d remains set until the completion of the write operation which is indicated by timer signals TIM1US and TIM100US.

During the writing of successive bytes into the EEPROM memory section 12-210, flip-flop 12-250d applies busy signal EEBUSY+1M as an input to the bus response logic of block 12-90 of FIG. 2. This causes the response logic to generate a negative response (NAK) for each command it receives from system bus 16. This permits the system to continue its operation in parallel with the writing of EEPROM unit 12-200.

At the completion of the operation, the HVS operating system is then able to issue an I/O command to switch regions of the EEPROM unit 12-200 allowing the microprocessor 12-20 to execute instructions of the boot code routines. This is done by applying an I/O command to system bus 16 which contains a function code of "01." Upon receipt of the I/O command, PAL circuit 12-250b causes signal QLTENB− to be switched from a binary ONE to a binary ZERO state.

Figure 8A:
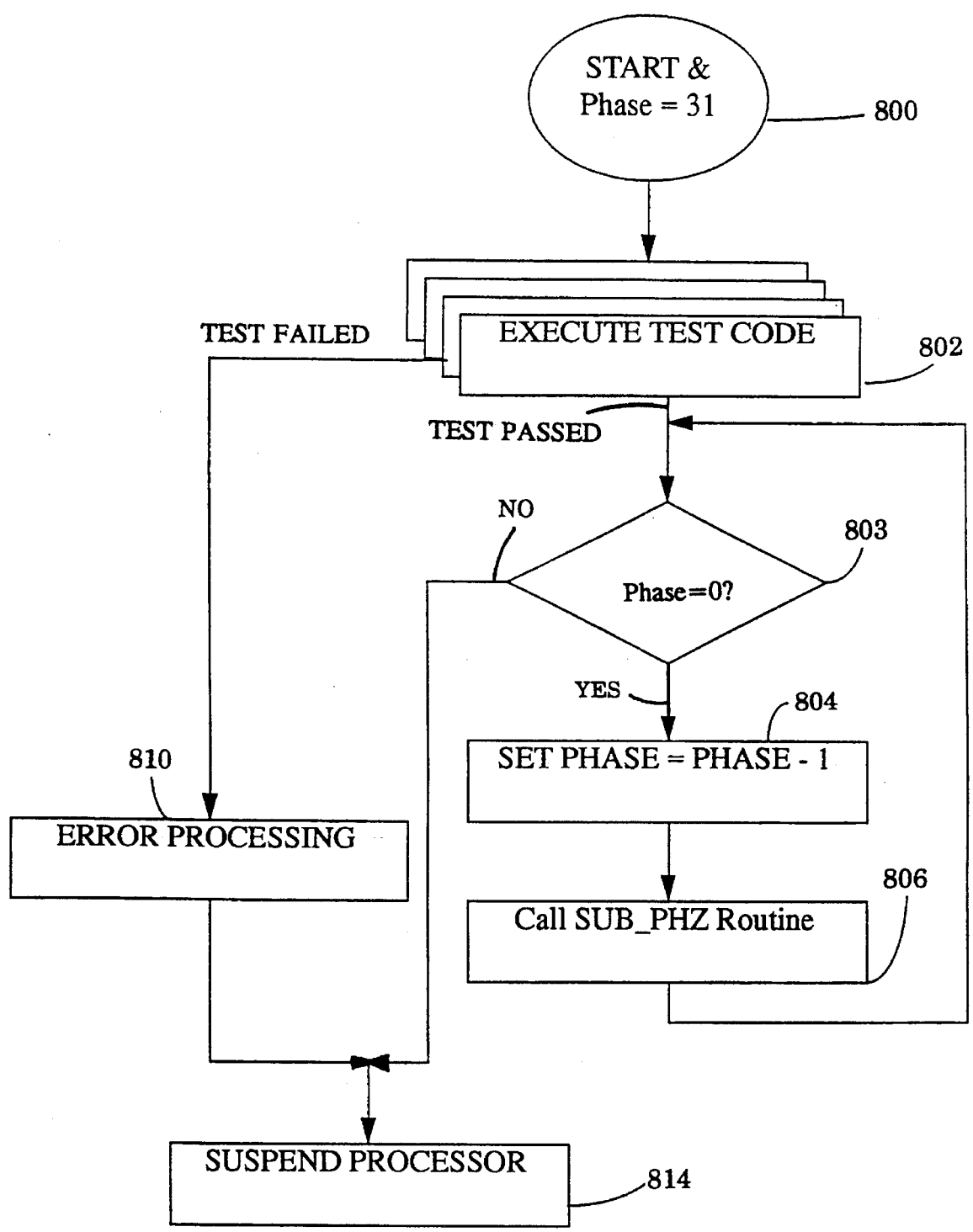
FIG. 8a shows the flow chart illustrating the sequencing of the main routine in controlling the execution of the different subroutines representing the different test phase of FIG. 8b.
Figures 1, 8B:
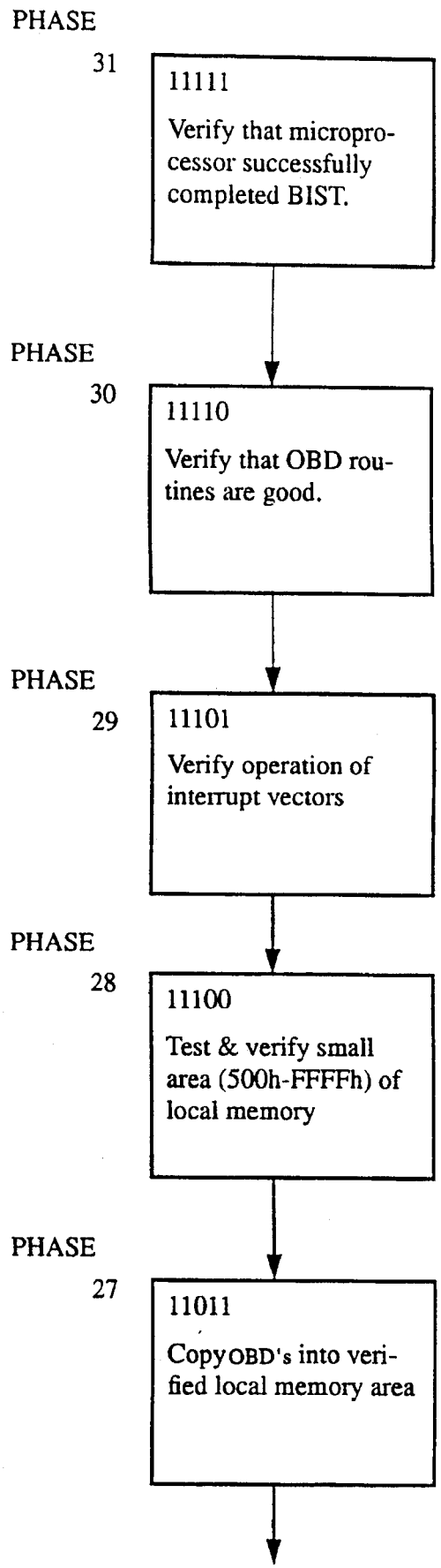
FIG. 8b shows in greate detail, the sequence of OBD tests which verify the operability of processing unit 12-2 according to the present invention.
Figures 3, 8B:
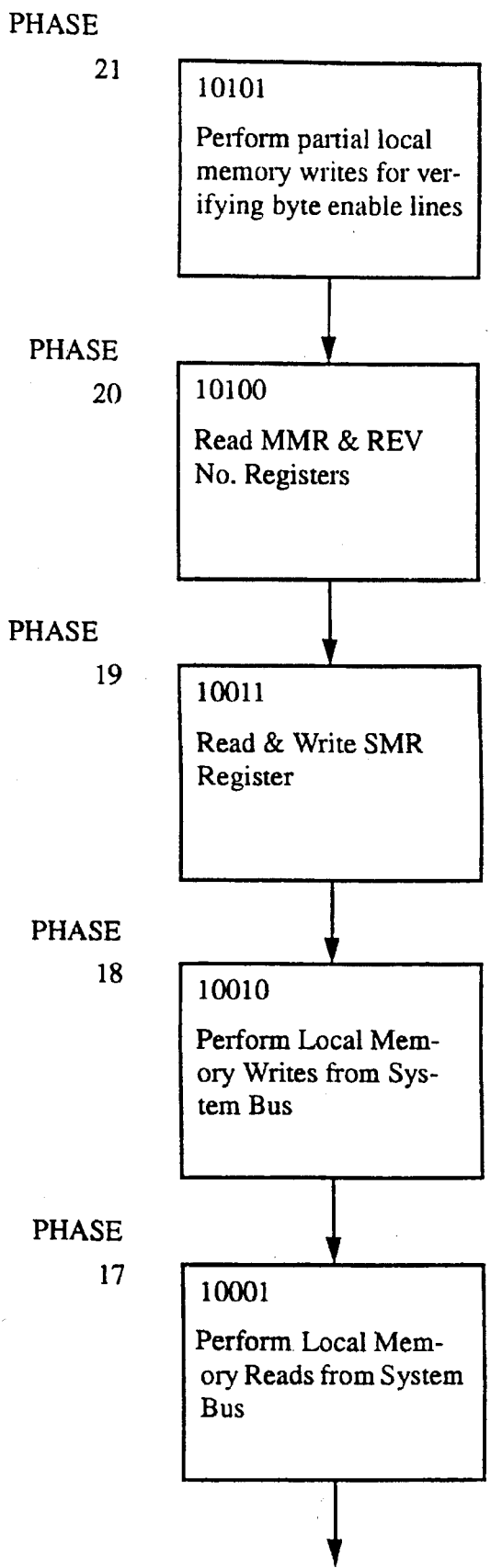
Figures 4, 8B:
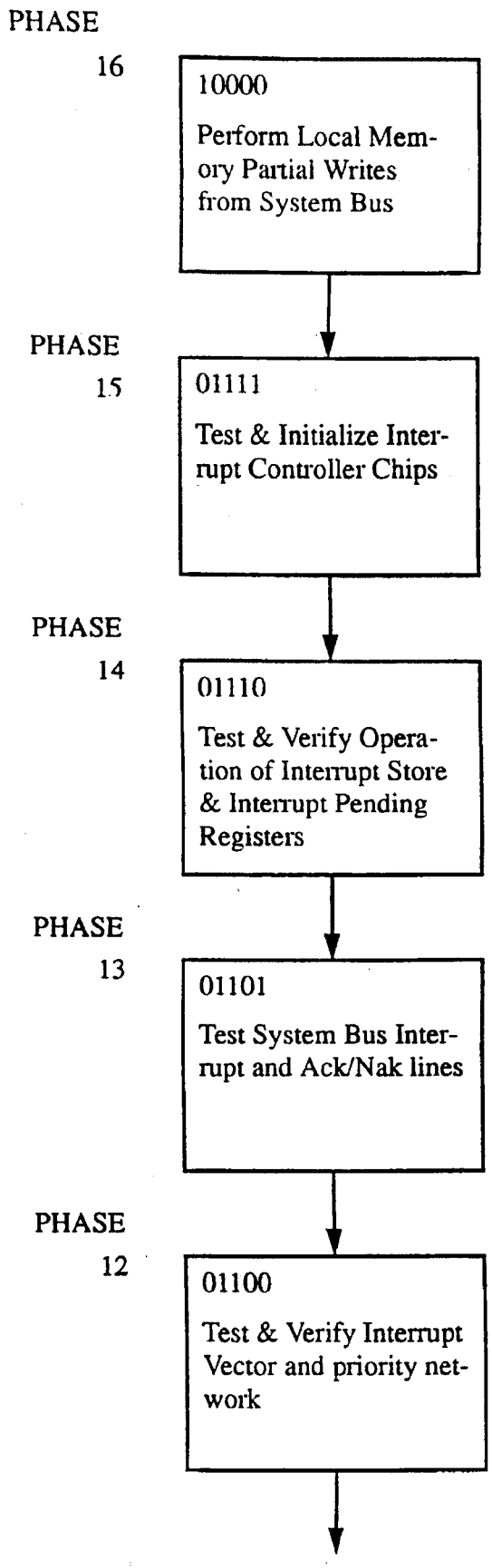
Figures 5, 8B:
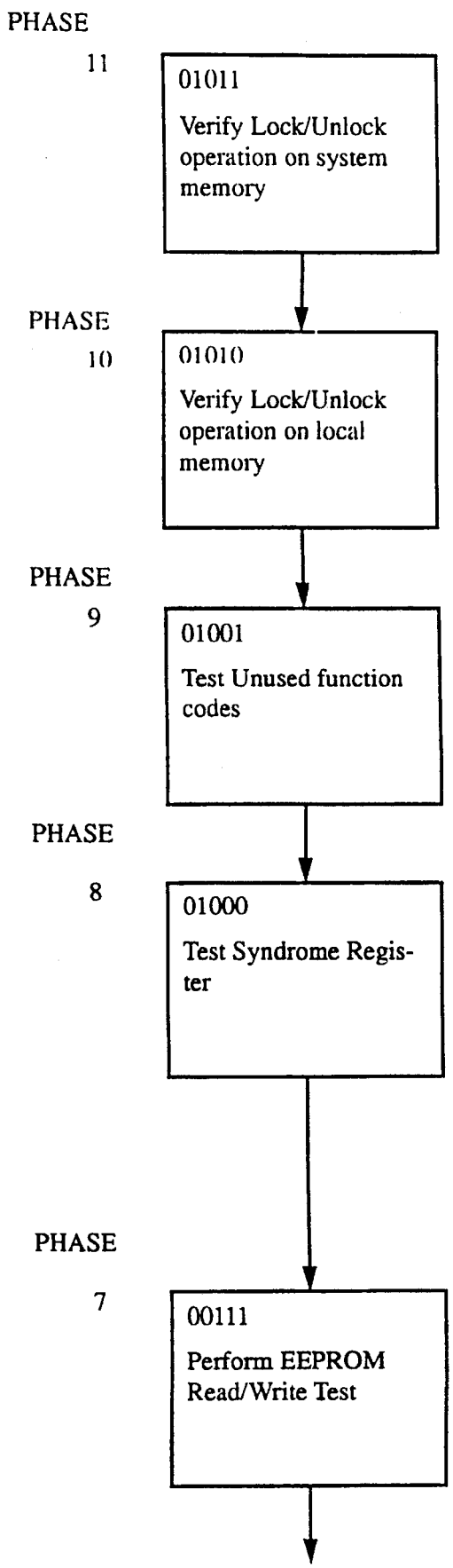
Figures 6, 8B:
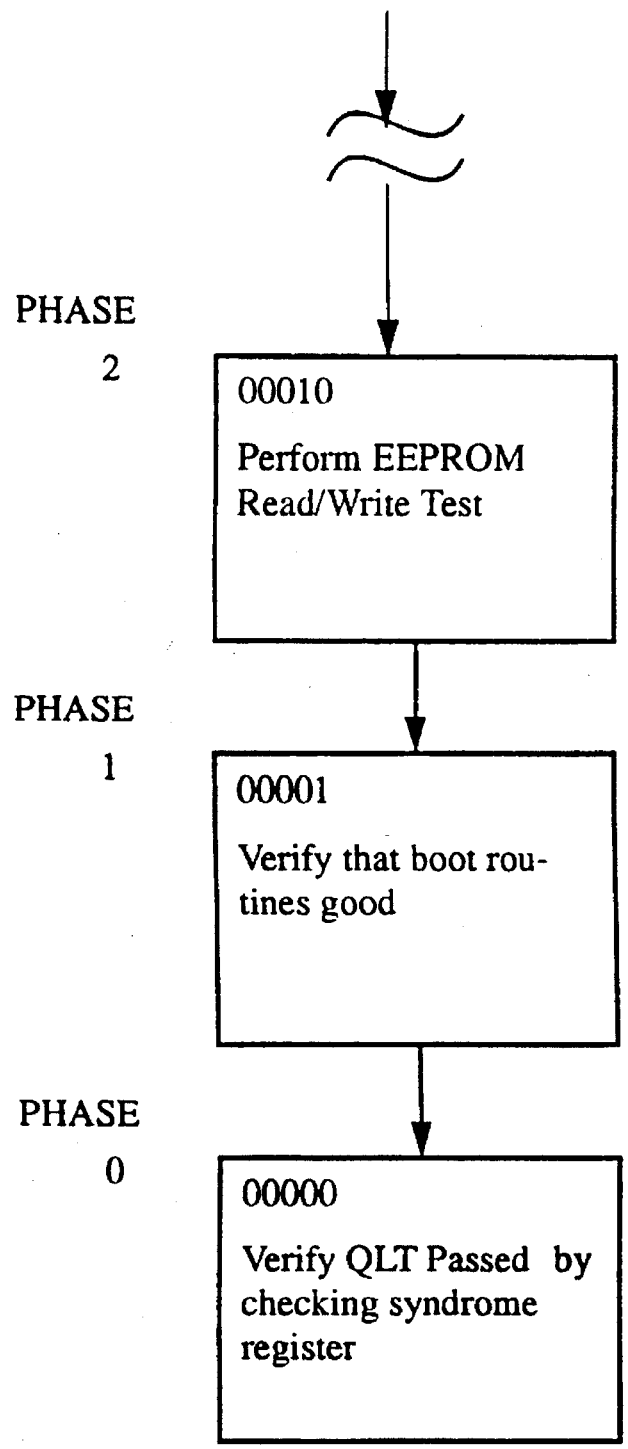

Description of FIGS. 8a and 8b

FIG. 8a is the flow chart illustrating the sequencing of the main routine in controlling the execution of the different subroutines representing the different test phases of FIG. 8b.

As seen from FIG. 8a, in response to power on, testing is started which results in presetting the channel address register 12-251 to all ONES (i.e., value of 31). This turns on all of the lights on panel 20.

After the execution of several initial phases of testing which completes sufficient level of verification of local memory 12-30, the main routine stores the phase value in a predetermined working location in local memory 12-30. Prior to that, the phase value is included as part of the main routine. However, in both cases, sequencing proceeds in the manner shown in FIG. 8a.

In greater detail, following execution of block 800, the main routine selects the subroutine defined by the current phase value of 31 and begins its execution as indicated by block 802. Upon successful completion of the test, the main routine sequences to block 803.

In this block, the main routine tests the current phase number to determine if all the test phases have been completed. When the phase number does not equal ZERO, the main routine sequences to block 804 which decrements by one, the current phase value. It then sequences to block 806. When the current phase value equals zero, the main routine sequences to block 814. Here, it suspends operation as previously described.

In block 806, the main routine calls or invokes the SUB_PHZ routine. This routine loads the phase and subphase numbers into channel address register 12-251. The main routine provides a ZERO value to the SUB_PHZ routine at the start of each new phase of testing. The main routine then sequences to block 802 for beginning the next phase of testing.

As shown in FIG. 8a, the occurrence of an error detected during the phase of testing by the test itself or by the processing unit causes a branch to block 810. This references a part of the main routine which performs the necessary housekeeping operations prior to suspending operation.

FIG. 8b shows in greater detail, the sequence of OBD tests which verify the operability of processing unit 12-2, according to the present invention. As seen from FIG. 8b, there are a maximum of 32 different phases or categories of tests which are executed by microprocessor 12-20 in block 710 of FIG. 5. Testing proceeds using a small part of processing unit 12-2 initially and increasing the area of testing until all of the parts of the processing unit have been verified as operational.

During each phase of testing, a number of subtests are executed. As described above, the routine SUB-PHZ is executed by microprocessor 12-20 which loads the proper phase code provided by the main routine, in addition to a subphase code passed to routine SUB-PHZ by the currently executing OBD test routine into channel address register 12-251. The routine SUB-PHZ expressed in the C programming language as OUTPW (CARW, ((phase <<11)|SUB)); when compiled includes the assembly code instructions included in the Appendix. These instructions set up the necessary conditions for loading the proper phase information into the CAR register circuits 12-251a, in response to load signal CARLD–.

Considering the testing in greater detail, it is seen that initially, the operation of microprocessor 12-20 is verified during phase 31 by causing the microprocessor to execute its BIST sequence in response to a reset command. Upon the successful completion of that test, microprocessor 12-20 next sequences to phase 30 which verifies that the OBD routines are in tact. This is accomplished by performing a check sum operation.

If, during the above sequences, a failure occurred, this causes a halt to all further operations as explained above. At that time, the five-bit contents of the channel address PAL circuit 12-251a1 are displayed on panel 20. This provides an immediate indication to system support personnel of a failure and more particularly of whether the board is the actual cause of a reported problem and should be replaced. For example, if a code of "31" was displayed on panel 20, it is clear that the board should be replaced since the microprocessor 12-20 appears defective. If, however, a code such as "17" was displayed, this would suggest that the fault may be in another part of the system as explained herein.

With additional hardware, such as the personal computer, the system of the present invention can be used in a factory or debugging environment. More specifically, using standard adapter circuits 30, the remaining contents of the channel address register can be used as an index to reference the contents of the stored test dictionary 50 for ascertaining the location of the component or components which have failed. The Glossary sets forth the contents of a representative test dictionary 50 used in the preferred embodiment of the present invention. The personal computer is programmed to display the applicable contents of the test dictionary which was selected by the fifteen-bit code residing in the channel register at the time of the failure. With this information, the faulty components can be quickly located and replaced.

Continuing on with the description of FIG. 8b, it will be noted that during phase 29, the operation of the local memory circuits involved in storing and retrieving of interrupt and trap vectors is verified. Next, a small portion of local memory 12-30 (i.e., addresses 500h-FFFF) is verified during phase 28. Once this is done, the OBD test routines are copied into the verified area of local memory enabling their execution to carried out as fast as possible.

As seen from FIG. 8b, testing continues by increasing the level of memory addressibility in phase 26 followed by testing the remaining areas of local memory 12-30, in addition to testing the channel address register 12-251 in phase 24 which will also be used to perform external operations. In phase 21, the processor's ability to perform partial memory writes to local memory 12-30 is verified. As seen from the Appendix, this involves a number of subphases of testing. The Appendix illustrates several parts or subtests in assembly code in greater detail. From these tests, it is seen how the SUB-PHZ routine and subphase constant values are passed on in sequence.

During phases 20 and 19, different ones of the registers of section 12-100 are checked. Beginning in phase 18, the processor's capability to perform external operations on system bus 16 is verified. This includes the ability to write and then read different ones of the registers of register section 12-100 to verify bus interconnections. Also, a series of partial write commands are executed in phase 16. In phase 13, the system bus interrupt and acknowledge/negative acknowledge logic is extensively tested following verifying the operability of the processor's interrupt facilities (i.e., interrupt controller 8259 chips) and interrupt store and interrupt registers contained within register section 12-100 during phases 15 and 14. The testing and verification of the interrupt related functionality is completed in phase 12.

There the interrupt vector generation and priority logic is verified. As seen from the Glossary, this involves a substantial number of subtests.

As seen from FIG. 8b, the lock functionality pertaining to executing main memory lock commands is verified during phase 11 and the local memory locking mechanism is tested in phase 10. Next, the error checking functionality is verified. This includes testing the ability to detect unused function codes in phase 9 and testing the ability to detect and store errors in the syndrome register. The final tests verify the operability of the boot section of EEPROM unit 12-200 in phase 2 and the correctness of the boot code in phase 1. In phase 0, the processor's ability to extinguish the QLT indicator is verified.

The above has shown how the method and apparatus of the present invention is able to completely test a processor board of a system independently of other units within the system without the need of special apparatus and at microprocessor speed.

It will be appreciated by those skilled in the art that many changes may be made without departing from the teachings of the present invention. For example, the invention may be used in conjunction with different types of memory devices, tests and commands. Also, while the preferred embodiment utilizes different PAL circuits to perform certain functions that such functions can be combined in certain instances and performed within a single circuit. Also, the invention is not limited to any specific type of circuit.

GLOSSARY INDEX

I. DESCRIPTION OF PAL CIRCUITS
II. DESCRIPTION OF SYSTEM VISIBLE REGISTERS
III. DESCRIPTION OF INTERNAL REGISTER(S)
IV. DESCRIPTION OF TEST DICTIONARY 50

APPENDICES

I. DESCRIPTION OF SUB-PHZ ROUTINE
II. EXAMPLE OBD TEST

GLOSSARY

I. DESCRIPTION OF PAL CIRCUITS

Description of equation symbols: (Where #=OR; !=negation; and &= AND)

PAL Circuit MODULE XCM67

Pin Specifications:

(Inputs)

| | |
|---|---|
| REFCLK | PIN 1; |
| !CARLD | PIN 2; |
| !BSMCLR | PIN 3; |
| QBDT08 | PIN 4; |
| QBDT09 | PIN 5; |
| QBDT10 | PIN 6; |
| QBDT11 | PIN 7; |
| QBDT12 | PIN 8; |
| QBDT14 | PIN 9; |
| QBDT15 | PIN 10; |

(Outputs)

| | |
|---|---|
| QLTPH0 | PIN 23; |
| QLTPH1 | PIN 22; |
| QLTPH2 | PIN 21; |
| QLTPH3 | PIN 20; |

-continued

PAL Circuit MODULE XCM67

Pin Specifications:

| | |
|---|---|
| QLTPH4 | PIN 19; |
| CAR00 | PIN 15; |
| CAR01 | PIN 14; |

Equates
RESET NODE 25;
EQUATIONS
RESET = BSMCLR;

| | | |
|---|---|---|
| QLTPH0 | := | !QBDT08 & CARLD # QLTPH0 & !CARLD; |
| QLTPH1 | := | !QBDT09 & CARLD # QLTPH1 & !CARLD; |
| QLTPH2 | := | !QBDT10 & CARLD # QLTPH2 & !CARLD; |
| QLTPH3 | := | !QBDT11 & CARLD # QLTPH3 & !CARLD; |
| QLTPH4 | := | !QBDT12 & CARLD # QLTPH4 & !CARLD; |
| CAR00 | := | !QBDT14 & CARLD # CAR00 & !CARLD; |
| CAR01 | := | !QBDT15 & CARLD # CAR01 & !CARLD; |

II. SYSTEM VISIBLE REGISTERS

1. Processor Control Command (PCC) Register is a 16-bit register used for exercising overall control over processing unit 12-2. The PCC register is written in response to an I/O request containing a function code (address bits 18-23 on system bus 16) value of 01 (FC=01). The information directed to the PCC register arrives via an output control command with at least a binary ONE in a specific bit position of a 16-bit control word (system bus data bits BSDT00–BSDT15), indicating the particular control action requested to take place (e.g. reset or suspend microprocessor operation).

Microprocessor View of Processor Control Command (PCC)

| 15 | 10 | 09 | 08 | 07 | 06 | 05 | 04 | 03 | 02 | 01 | 00 |
|---|---|---|---|---|---|---|---|---|---|---|---|
| | | E | E | B | S | | R | | C | Q | Q |
| ... | | B | Q | S | U | | E | | S | O | O |
| | | P | P | T | S | | S | | B | N | F |
| | | / | / | | | | | | | | |
| | | / | /_Enable QLT Program | | | | | | | | |
| | | /_Enable Boot Program | | | | | | | | | |

System Bus View of PCC

| 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|
| B | S | | R | | C | Q | Q | | | | | | | E | E |
| S | U | | E | | S | O | O | | | | | | | B | Q |
| T | S | | S | | B | N | F | | | | | | | P | P |
| / | / | | / | | / | / | /_Turn QLT ind. off | | | | | | | | |
| / | / | | / | | / | /_Turn QLT ind. on | | | | | | | | | |
| / | / | | / | /_Clear Syndrome reg. | | | | | | | | | | | |
| / | / | | /_Resume with proc. after halt | | | | | | | | | | | | |

-continued

/ /—Suspend with proc. oper.

/—Reset with proc. to run built-in-self-test & start QLT or boot routines.

2. The Software Message Register (SMR) is a 16-bit register which is normally used by the operating systems to exchange messages therebetween. It is loaded from system bus 16. The SMR register is loaded from system bus 16 in response to an I/O command containing a function code (FC) value of 11 via data leads BSDT(00–15). The contents of the SMR register are placed on data leads BSDT(00–15) as part of a normal system bus response cycle, in response to an I/O command containing a function code (FC) value of 10.

3. The Revision-Number Register (RNR) is a read-only 16-bit constant register which contains the hardware revision number of the processor 12-2. The register contents are placed on the system bus data leads BSDT(00–15), in response to an I/O command containing a function code (FC) value of 22.

4. The Memory Module Register (MMR) stores a value interpreted as the starting address of the processor's on-board memory as seen from the system bus. The value is in terms of 16-Megabyte increments (i.e., the actual start address has 24 zero bits to the right of the number provided. The Memory Module Register is a read/write 8-bit register which contains an 8-bit module number. The Memory Module Register is loaded from system bus data leads BSDT(00–07) in response to an I/O command containing a function code (FC) value of 25. The contents of the Memory Module Register are placed on system bus data leads BSDT(00–07) and by placing zeroes on system bus data leads BSDT(08–15) in response to an I/O command containing a function code (FC) value of 24.

5. The Identification Register (IR) is a read-only 16-bit register which supplies a code constant to HVS operating system identifying it as a peer processor. The contents of the ID register are placed on data leads BSDT(00–15) as part of a normal system bus response cycle in response to an I/O command containing a function code (FC) value of 26.

6. The EEPROM Address Register (EAR) is loaded from system bus data leads BSDT(01–15) in response to an I/O command containing a function code (FC) value of 29. The EEPROM array contains two 64 KB banks selected by QPE. The addressing range is 0000–7FFF sixteen-bit words (BSDT00 is ignored). The data from system bus data leads BSDT(00–15) is written into the 16-bit EEPROM "word-location" as addressed by the previous Load-EEPROM-Address-Register command in response to an I/O command containing a function code (FC) value of 2D. For each FC=2D command, 16 data bits are written into the EEPROM location specified by the EEPROM Address Register. The 16-bit EEPROM "word" as addressed by the previous Load-EEPROM– Address-Register command is placed on system bus data leads BSDT(00–15) in response to an I/O command containing a function code (FC) value of 28.

7. The Syndrome Register (SR) is a 16-bit read-only register which records the occurrence of unusual events encountered during operation of the processor 12-2. The Syndrome Register content is placed on data leads (BSDT(00–15) as part of a system bus response cycle in response to an I/O command containing a function code (FC) value of 3E.

8. Interrupt Pending Registers 0 and 1 are used for identifying an interrupt source. The registers are loaded in response to a load interrupt pending register command containing a function code value of 21 (IPR0) or 2B (IPR1) (FC=21 or FC=2B) which names a location to be read from the interrupt pending store (IPS) RAM specified by system bus data bits 12-15) and loaded into IPR0 or IPR1 registers. A second read interrupt pending register command containing a functional code value of 20 (IPR0) or 2A (IPR1) (FC=20 or FC=2A) when issued causes the IPR contents identifying the interrupting source to be returned via system bus 16. The two IPR registers permit both operating systems to concurrently access the IPS RAM.

III. PROCESSOR INTERNAL REGISTER(S)

a. Channel Address Register (CAR)

The channel address register is preloaded by software prior to issuing a series of I/O commands. It is a 16-bit register used to store an I/O channel number in bit positions 9-0 to be transmitted to the system bus 16 to specify the I/O destination address of a microprocessor issued INw/OUTw command on I/O operations. Additionally, bit positions 12-10 store the states of the M/IO, D/C, and W/R leads of each transaction issued by microprocessor 12-20. The CAR register is read in response to a function code value of 40 and written in response to a function code value of 41.

Microprocessor View of Channel Address Register 15 14 13 12 11 10 09 08 07 06 05 04 03 02 01 00

QLT PHASE    RFU                                CH9

CH0  CH1 . . . .
SW  BNK  MIO  D/C  W/R

01    /     /____/_____/

/    /    /—Prior Transaction Indicators

/    /—System Bus I/O Nack Response

/—Two Least Significant Channel Number Bits

IV. TEST DICTIONARY

| PHASE # | BINARY # | File Name | SPECIFIC TEST |
|---|---|---|---|
| PHASE 31 | 11111 | SUPER.ASM | CHECK EAX TO SEE IF PASSED |
| PHASE 30 | 11110 | CHKS.ASM | EEPROM CHECKSUM OCCURS |
| PHASE 29 | 11101 | CPIV.ASM | COPY IV'S TO DRAM'S |
| PHASE 28 | 11100 | M500.ASM | 500h–FFFFh MEMORY TEST |
| PHASE 27 | 11011 | CPDG.ASM | COPY OBD'S TO DRAM |
| PHASE 26 | 11010 | LDMM.ASM | LOAD MMU INFORMATION |
| PHASE 25 | 11001 | LOWM.ASM | 0–500h MEMORY TEST |
| PHASE 24 | 11000 | CAR.C | CHANNEL ADDRESS REGISTER TEST |
| PHASE 23 | 10111 | RESI.ASM | RESOURCE ID REGISTER TEST |
| PHASE 22 | 10110 | UPMM.ASM | FFFFh - X MB MEMORY TEST |
| PHASE 21 | 10101 | PWLO.ASM | PARTIAL WRITES LOCALLY |
| PHASE 20 | 10100 | MMRORU.C | READ MMR, REV NUMBER REG |
| PHASE 19 | 10011 | SMR.C | WRITE + READ SMR |

IV. TEST DICTIONARY

| PHASE # | BINARY # | File Name | SPECIFIC TEST |
|---|---|---|---|
| PHASE 18 | 10010 | MBWT.ASM | MEMORY WRITE FROM SYSTEM BUS |
| PHASE 17 | 10001 | MBRD.ASM | READ MEMORY FROM SYSTEM BUS |
| PHASE 16 | 10000 | MBPW.ASM | PARTIAL WRITES FROM SYSTEM BUS |
| PHASE 15 | 01111 | SET59S.ASM | TEST AND INITIALIZE 8259 CHIP |
| PHASE 14 | 01110 | IPS.C | TEST IPS AND IPR'S |
| PHASE 13 | 01101 | ACKN.ASM | TEST SYSTEM BUS INT AND ACK/NAK |
| PHASE 12 | 01100 | IPRI.ASM | TEST INT VECTOR + PRIORITY |
| PHASE 11 | 01011 | | UNUSED LOCK/UNLOCK OF HVS MEMORY |
| PHASE 10 | 01010 | LOLK.ASM | LOCK/UNLOCK OF LOCAL MEMORY |
| PHASE 09 | 01001 | FUNC.ASM | UNUSED FUNCTION CODE TEST |
| PHASE 08 | 01000 | SYN.ASM | TEST SYNDROME REGISTER |
| PHASE 07 | 00111 | RFU | |
| PHASE 06 | 00110 | RFU | |
| PHASE 05 | 00101 | RFU | |
| PHASE 04 | 00100 | RFU | |
| PHASE 03 | 00011 | RFU | |
| PHASE 02 | 00010 | EEP.ASM | EEPROM READ/WRITE TEST |
| PHASE 01 | 00001 | BOOT.ASM | CHECK SUM THE BOOT EEPROM |
| PHASE 00 | 00000 | SUPER.ASM | QLT PASSED ! |

| PHASE LIGHTS | CAR | PROBABLE CAUSE |
|---|---|---|
| 1 1 1 1 1 SUPER.ASM | xxxx | Built in Self Test Failed on microprocessor. 1) microprocessor is not connected correctly (socket) 2) microprocessor went bad 3) EEPROM's lost there memory. |
| 1 1 1 1 0 CHKS.ASM | F0xx | Checksum of the EEPROM failed. 1) NMI occured, due to bad parity 2) EEPROM's are corrupted |
| 1 1 1 0 1 CPIV.ASM | E8xx | Copy interrupt vectors to DRAM. 1) The DRAMS are not holding the vectors 2) On read back of the DRAM parity error NMI 3) Incorrect Data returned due to Data bus stuck at. |
| 1 1 1 0 0 M500.ASM | E002 | PASS 2 of memory test (500 - 64k) failed 1) A bit is stuck while addressing DRAM 2) A bit is stuck on data return from DRAM 3) NMI occured due to bad parity 4) Refresh of DRAM's failing. 5) The data should be the same as the address |
| 1 1 1 0 0 M500.ASM | E003 | PASS 3 of memory test (500 - 64k) failed 1) A bit is stuck while addressing DRAM 2) A bit is stuck on data return from DRAM 3) NMI occured due to bad parity 4) Refresh of DRAM's failing. 5) Data should be the complement of the address |
| 1 1 0 1 1 CPDG.ASM | D8xx | Copy OBD to DRAM 1) The DRAMS are not holding the obd. 2) On read back of the DRAM parity error NMI 3) Should never happen because DRAMs are ok |
| 1 1 0 1 0 LDMM.ASM | D0xx | Load MMU Information 1) Problem reading EEPROM 2) Chip not in protected mode (486 problem) |
| 1 1 0 0 1 LOWM.ASM | C802 | Pass 2 of the memory test (0-500h) 1) A bit is stuck while addressing DRAM 2) A bit is stuck on data return from DRAM 3) NMI occured due to bad parity 4) Refresh of DRAM's failing. 5) The data should be the same as the address |
| 1 1 0 0 1 LOWM.ASM | C803 | Pass 3 of the memory test (0-500h) 1) A bit is stuck while addressing DRAM 2) A bit is stuck on data return from DRAM 3) NMI occured due to bad parity 4) Refresh of DRAM's failing. 5) Data should be the complement of the address |
| 1 1 0 0 0 CAR.C | C1A5 | Test Channel Address Register (Pass 1) 1) Register did not remember data 2) NMI occured due to parity 3) Stuck at data bit |
| 1 1 0 0 0 CAR.C | C25A | Test Channel Address Register (Pass 2) 1) Register did not remember data 2) NMI occured due to parity 3) Stuck at data bit on complement |
| 1 1 0 0 0 CAR.C | C000 | Test Channel Address Register (Pass 3) 1) Register unable to clear itself. 2) NMI occured due to parity 3) Stuck at data bit on clearing. |
| 1 0 1 1 1 RESI.ASM | B8xx | Test the Resource ID Register 1) Resource ID (FC = 26) is not equal to 848x 2) System bus I/O NAK Response = 1 (NAKed) found by Reading CAR (FC = 40) bit 13 = 1. 3) Check for NMI occuring. |
| 1 0 1 1 0 UPMM.ASM | B001 | Memory Test (64k-End of Memory) Sizing of the Memory. 1) Resource ID(FC = 26) is not equal to 848x 2) Memory Size is incorrect (bit 0 and 1) of Resource |

| PHASE LIGHTS | CAR | PROBABLE CAUSE |
| --- | --- | --- |
| | | ID Register<br>3) System bus I/O NAK Response = 1 (NAKed) found by Reading CAR (FC = 40) bit 13 = 1.<br>4) Check for NMI occurance. |
| 1 0 1 1 0<br>UPMM.ASM | B002 | Memory Test (64k-End of Memory) Pass 2 of the Memory test.<br>1) A bit is stuck while addressing DRAM<br>2) A bit is stuck on data return from DRAM<br>3) NMI occured due to bad parity<br>4) Refresh of DRAM's failing.<br>5) The data should be the same as the address |
| 1 0 1 1 0<br>UPMM.ASM | B003 | Memory Test (64k-End of Memory) Pass 3 of the Memory test.<br>1) A bit is stuck while addressing DRAM<br>2) A bit is stuck on data return from DRAM<br>3) NMI occured due to bad parity<br>4) Refresh of DRAM's failing.<br>5) Data should be the complement of the address |
| 1 0 1 0 1<br>PWLO.ASM | A801 | Partial Writes Locally (BYTE 0)<br>1) Incorrect byte is written should be byte 0<br>2) Byte Enable signal is stuck at wrong value<br>3) BE signal should equal byte 0<br>4) NMI occured |
| 1 0 1 0 1<br>PWLO.ASM | A802 | Partial Writes Locally (BYTE 1)<br>1) Incorrect byte is written should be byte 1<br>2) Byte Enable signal is stuck at wrong value<br>3) BE signal should equal byte 1<br>4) NMI occured |
| 1 0 1 0 1<br>PWLO.ASM | A803 | Partial Writes Locally (BYTE 2)<br>1) Incorrect byte is written should be byte 2<br>2) Byte Enable signal is stuck at wrong value<br>3) BE signal should equal byte 2<br>4) NMI occured |
| 1 0 1 0 1<br>PWLO.ASM | A804 | Partial Writes Locally (BYTE 3)<br>1) Incorrect byte is written should be byte 3<br>2) Byte Enable signal is stuck at wrong value<br>3) BE signal should equal byte 3<br>4) NMI occured |
| 1 0 1 0 1<br>PWLO.ASM | A805 | Partial Writes Locally (LOW WORD)<br>1) Incorrect word is written should be low word<br>2) Byte Enable signal is stuck at wrong value<br>3) BE signal should equal Low Word<br>4) NMI occured |
| 1 0 1 0 1<br>PWLO.ASM | A806 | Partial Writes Locally (HIGH WORD)<br>1) Incorrect word is written should be high word<br>2) Byte Enable signal is stuck at wrong value<br>3) BE signal should equal High Word<br>4) NMI occured |
| 1 0 1 0 1<br>PWLO.ASM | A807 | Partial Writes Locally (MIDDLE WORD)<br>1) Incorrect word is written should be middle<br>2) Byte Enable signal is stuck at wrong value<br>3) BE signal should equal Middle Word<br>4) NMI occured |
| 1 0 1 0 1<br>PWLO.ASM | A808 | Partial Writes Locally (HIGH 3 & LOW BYTE)<br>1) Incorrect word is written should do a write to low byte then high 3<br>2) Byte Enable signal is stuck at wrong value<br>3) BE signal should be Low Byte and then High 3<br>4) NMI occured |
| 1 0 1 0 1<br>PWLO.ASM | A809 | Partial Writes Locally (LOW 3 & HIGH BYTE)<br>1) Incorrect word is written should do a write to low 3 then high BYTE<br>2) Byte Enable signal is stuck at wrong value<br>3) BE signal should be Low 3 and then High BYTE<br>4) NMI occured |
| 1 0 1 0 0<br>MMRORU.C | A001 | Memory Module Register Test<br>1) MMR (FC - 24) not equal to 80h on power up<br>2) Register has a pin stuck at wrong value<br>3) NMI occured<br>4) System bus I/O NAK Response = 1 (NAKed) found by Reading CAR (FC = 40) bit 13 = 1. |
| 1 0 1 0 0<br>MMRORU.C | A002 | Memory Module Register Test<br>1) MMR (FC-25) write of complement failed<br>2) MMR (FC-24) read has wrong data due to pin stuck at wrong value.<br>3) NMI occured.<br>4) System bus I/O NAK Response = 1 (NAKed) found by Reading CAR (FC = 40) bit 13 = 1. |
| 1 0 1 0 0<br>MMRORU.C | A003 | Memory Module Register Test<br>1) Read of the syndrome register (FC = 3e).<br>2) Clear the register.<br>3) Make sure no retries occured |
| 1 0 1 0 0<br>MMRORU.C | A004 | Memory Module Register Test<br>1) MMR (FC-25) write register = 80h.<br>2) MMR (FC-24) read has wrong data due to pin stuck at wrong value.<br>3) UMI occured.<br>4) System bus I/O NAK Response = 1 (NAKed) found by Reading CAR (FC = 40) bit 13 = 1. |
| 1 0 1 0 0<br>MMRORU.C | A005 | ORU Revision Number Register Test<br>1) ORU (FC-22) read fails<br>2) System bus I/O NAK Response = 1 (NAKed) found |

| PHASE LIGHTS | CAR | PROBABLE CAUSE |
|---|---|---|
| | | by Reading CAR (FC = 40) bit 13 = 1.<br>3) Syndrome Register (FC-3E) saw a retry.<br>4) Value returned from ORU is less then 0. |
| 1 0 0 1 1<br>SMR.C | 9801 | Software Message Register Test<br>1) SMR (FC-11) write of 5a5a failed<br>2) SMR (FC-10) read did not find a 5a5a<br>3) NMI occured<br>4) System bus I/O NAK Response = 1 (NAKed) found by Reading CAR (FC = 40) bit 13 = 1.<br>5) Syndrome Register (FC-3E) saw a retry.<br>6) SMR has a stuck at bit. |
| 1 0 0 1 1<br>SMR.C | 9802 | Software Message Register Test<br>1) SMR (FC-11) write of a5a5 failed<br>2) SMR (FC-10) read did not find a a5a5<br>3) NMI occured<br>4) System bus I/O NAK Response = 1 (NAKed) found by Reading CAR (FC = 40) bit 13 = 1.<br>5) Syndrome Register (FC-3E) saw a retry.<br>6) SMR has a stuck at bit. |
| 1 0 0 1 0<br>MBWT.ASM | 9001 | Write through system bus read locally<br>1) Resource ID (FC-26) read for mem size failed.<br>2) System bus I/O NAK Response = 1 (NAKed) found by Reading CAR (FC = 40) bit 13 = 1.<br>3) Syndrome Register (FC-3E) saw a retry. |
| 1 0 0 1 0<br>MBWT.ASM | 9002 | Write through system bus read locally<br>1) MMR (FC-25) write for mem size failed.<br>2) System bus I/O NAK Response = 1 (NAKed) found by Reading CAR (FC = 40) bit 13 = 1.<br>3) Syndrome Register (FC-3E) saw a retry. |
| 1 0 0 1 0<br>MBWT.ASM | 9003 | Write through system bus read locally<br>1) Write data of 01234567 through the system bus<br>2) Wrong data returned when read locally<br>3) System bus connector has a stuck at fault<br>4) NMI occured |
| 1 0 0 1 0<br>MBWT.ASM | 9004 | Write through system bus read locally<br>1) Write data of fedcba98 through the system bus<br>2) Wrong data returned when read locally<br>3) System bus connector has a stuck at fault<br>4) NMI occured<br>5) Reset of MMR(FC-25) register to 80h failed |
| 1 0 0 0 1<br>MBRD.ASM | 8801 | Write locally Read through the system bus<br>1) Resource ID (FC-26) read for mem size failed.<br>2) System bus I/O NAK Response = 1 (NAKed) found |

| PHASE LIGHTS | CAR | PROBABLE CAUSE |
|---|---|---|
| | | by Reading CAR (FC = 40) bit 13 = 1<br>3) Syndrome Register (FC-3E) saw a retry. |
| 1 0 0 0 1<br>MBRD.ASM | 8802 | Write locally Read through the system bus<br>1) MMR (FC-25) write for mem size failed.<br>2) System bus I/O NAK Response = 1 (NAKed) found by Reading CAR (FC = 40) bit 13 = 1.<br>3) Syndrome Register (FC-3E) saw a retry. |
| 1 0 0 0 1<br>MBRD.ASM | 8803 | Write locally Read through the system bus<br>1) Write data of fedcba98 locally<br>2) Wrong data read through system bus<br>3) System bus connector has a stuck at fault<br>4) NMI occured |
| 1 0 0 0 1<br>MBRD.ASM | 8804 | Write locally Read through the system bus<br>1) Write data of fedcba98 through the system bus<br>2) Wrong data returned when read locally<br>3) System bus connector has a stuck at fault<br>4) NMI occured<br>5) Reset of MMR(FC-25) register to 80h failed |
| 1 0 0 0 0<br>MBPW.ASM | 8001 | System bus Partial Write Test (BYTE 0)<br>1) Incorrect byte is written should be byte 0<br>2) Byte Enable signal is stuck at wrong value<br>3) BE signal should equal byte 0<br>4) NMI occured |
| 1 0 0 0 0<br>MBPW.ASM | 8002 | System bus Partial Write Test (BYTE 1)<br>1) Incorrect byte is written should be byte 1<br>2) Byte Enable signal is stuck at wrong value<br>3) BE signal should equal byte 1<br>4) NMI occured |
| 1 0 0 0 0<br>MBPW.ASM | 8003 | System bus Partial Write Test (BYTE 2)<br>1) Incorrect byte is written should be byte 2<br>2) Byte Enable signal is stuck at wrong value<br>3) BE signal should equal byte 2<br>4) NMI occured |
| 1 0 0 0 0<br>MBPW.ASM | 8004 | System bus Partial Write Test (BYTE 3)<br>1) Incorrect byte is written should be byte 3<br>2) Byte Enable signal is stuck at wrong value<br>3) BE signal should equal byte 3<br>4) NMI occured |
| 1 0 0 0 0<br>MBPW.ASM | 8005 | System bus Partial Write Test (LOW WORD)<br>1) Incorrect word is written should be LOW WORD<br>2) Byte Enable signal is stuck at wrong value<br>3) BE signal should equal LOW WORD |

| PHASE LIGHTS | CAR | PROBABLE CAUSE |
|---|---|---|
| 1 0 0 0 0<br>MBPW.ASM | 8006 | 4) NMI occured<br>System bus Partial Write Test<br>(HIGH WORD)<br>1) Incorrect word is written<br>should be HIGH WORD<br>2) Byte Enable signal is stuck<br>at wrong value<br>3) BE signal should equal HIGH WORD<br>4) NMI occured |
| 1 0 0 0 0<br>MBPW.ASM | 8007 | System bus Partial Write Test<br>(MIDDLE WORD)<br>1) Incorrect word is written<br>should be MIDDLE WORD<br>2) Byte Enable signal is stuck<br>at wrong value<br>3) BE signal should equal<br>MIDDLE WORD<br>4) NMI occured |
| 1 0 0 0 0<br>MBPW.ASM | 8008 | System bus Partial Write Test<br>(HIGH 3 & LDW BYTE)<br>1) Incorrect word is written<br>should do a write to low<br>byte then high 3<br>2) Byte Enable signal is stuck<br>at wrong value<br>3) BE signal should be Low<br>Byte and then High 3<br>4) NMI occured |
| 1 0 0 0 0<br>MBPW.ASM | 8009 | System bus Partial Write Test<br>(LOW 3 & HIGH BYTE)<br>1) Incorrect word is written<br>should do a write to low 3<br>then high BYTE<br>2) Byte Enable signal is stuck<br>at wrong value<br>3) BE signal should be Low 3<br>and then High BYTE<br>4) NMI occured |
| 0 1 1 1 1<br>SET59S.ASM | 7800 | Set up the 8259 chips<br>1) Test will set up the 8259<br>chips to behave in a<br>master/slave fashion.<br>2) NMI occurred while writing<br>8259 ports<br>3) Problem with pins on 8259 chip. |
| 0 1 1 1 0<br>IPS.C | 7001 | Test IPS and IPR's<br>1) Failed during a write to<br>the interrupt pending<br>store. Using FC-23. |
| 0 1 1 1 0<br>IPS.C | 7002 | Test IPS and IPR's<br>1) Read back of the data in<br>the interrupt pending store<br>failed.<br>2) Stuck at fault on the IPS<br>rams.<br>3) Read IPS to IPR0 and IPR1<br>and see that data is equal<br>to data stored in IPS.<br>4) Problem with IPR0 or IPR1<br>data to these register<br>wrong<br>5) Problem when data read from<br>these registers<br>6) One of the interrupt pend-<br>ing registers does not<br>match the data.<br>7) Write back to IPS the<br>complement data<br>8) See that IPR0 has no stuck<br>at bits during read back of<br>complement. |
| 0 1 1 1 0<br>IPS.C | 7003 | Test IPS and IPR's<br>1) Read data from the IPS to<br>IPR1.<br>2) IPR1 has a stuck at bit<br>data is wrong |
| 0 1 1 0 1<br>ACKN.ASM | 6801 | 3) clear out the IPS.<br>Test system bus INT and<br>ACK/NAK Logic<br>1) Failed during set up of<br>8259 chips |
| 0 1 1 0 1<br>ACKN.ASM | 6802 | Test system bus INT and<br>ACK/NAK Logic<br>1) Interrupt 30 did not arrive<br>in store.<br>2) Complemented interrupt 30<br>was ACKed instead of NAKed.<br>3) Interrupt Read Register on<br>the 8259 chip's data does<br>not match expected<br>interrupt |
| 0 1 1 0 1<br>ACKN.ASM | 6803 | Test system bus INT and<br>ACK/NAK Logic<br>1) Interrupt 31 did not arrive<br>in store.<br>2) Complemented interrupt 31<br>was ACKed instead of NAKed.<br>3) Interrupt Read Register on<br>the 8259 chip's data<br>does not match expected<br>interrupt<br>4) Check that prior interrupt<br>cleared |
| 0 1 1 0 1<br>ACKN.ASM | 6804 | Test system bus INT and<br>ACK/NAK Logic<br>1) Interrupt 32 did not arrive<br>in store.<br>2) Complemented interrupt 32<br>was ACKed instead of NAKed.<br>3) Interrupt Read Register on<br>the 8259 chip's data does<br>not match expected<br>interrupt<br>4) Check that prior interrupt<br>cleared |
| 0 1 1 0 1<br>ACKN.ASM | 6805 | Test system bus INT and<br>ACK/NAK Logic<br>1) Interrupt 33 did not arrive<br>in store.<br>2) Complemented interrupt 33<br>was ACKed instead of NAKed.<br>3) Interrupt Read Register on<br>the 8259 chip's data does<br>not match expected<br>interrupt<br>4) Check that prior interrupt<br>cleared |
| 0 1 1 0 1<br>ACKN.ASM | 6806 | Test system bus INT and<br>ACK/NAK Logic<br>1) Interrupt 34 did not arrive<br>in store.<br>2) Complemented interrupt 34<br>was ACKed instead of NAKed.<br>3) Interrupt Read Register on<br>the 8259 chip's data does<br>not match expected<br>interrupt<br>4) Check that prior interrupt<br>cleared |
| 0 1 1 0 1<br>ACKN.ASM | 6807 | Test system bus INT and<br>ACK/NAK Logic<br>1) Interrupt 35 did not arrive<br>in store.<br>2) Complemented interrupt 35<br>was ACKed instead of NAKed.<br>3) Interrupt Read Register on<br>the 8259 chip's data does<br>not match expected<br>interrupt<br>4) Check that prior interrupt<br>cleared |
| 0 1 1 0 1<br>ACKN.ASM | 6808 | Test system bus INT and<br>ACK/NAK Logic<br>1) Interrupt 36 did not arrive |

| PHASE LIGHTS | CAR | PROBABLE CAUSE |
|---|---|---|
| | | in store.<br>2) Complemented interrupt 36 was ACKed instead of NAKed.<br>3) Interrupt Read Register on the 8259 chip's data does not match expected interrupt<br>4) Check that prior interrupt cleared |
| 0 1 1 0 1<br>ACKN.ASM | 6809 | Test system bus INT and ACK/NAK Logic<br>1) Interrupt 37 did not arrive in store.<br>2) Complemented interrupt 37 was ACKed instead of NAKed.<br>3) Interrupt Read Register on the 8259 chip's data does not match expected interrupt<br>4) Check that prior interrupt cleared |
| 0 1 1 0 1<br>ACKN.ASM | 680a | Test system bus INT and ACK/NAK Logic<br>1) Interrupt 38 did not arrive in store.<br>2) Complemented interrupt 38 was ACKed instead of NAKed.<br>3) Interrupt Read Register on 8259 chip's data does not match expected interrupt<br>4) Check that prior interrupt cleared |
| 0 1 1 0 1<br>ACKN.ASM | 680b | Test system bus INT and ACK/NAK Logic<br>1) Interrupt 39 did not arrive in store.<br>2) Complemented interrupt 39 was ACKed instead of NAKed.<br>3) Interrupt Read Register on the 8259 chip's data does not match expected interrupt<br>4) Check that prior interrupt cleared |
| 0 1 1 0 1<br>ACKN.ASM | 680c | Test system bus INT and ACK/NAK Logic<br>1) Interrupt 3a did not arrive in store.<br>2) Complemented interrupt 3a was ACKed instead of NAKed.<br>3) Interrupt Read Register on the 8259 chip's data does not match expected interrupt<br>4) Check that prior interrupt cleared |
| 0 1 1 0 1<br>ACKN.ASM | 680d | Test system bus INT and ACK/NAK Logic<br>1) Interrupt 3b did not arrive in store.<br>2) Complemented interrupt 3b was ACKed instead of NAKed.<br>3) Interrupt Read Register on the 8259 chip's data does not match expected interrupt<br>4) Check that prior interrupt cleared |
| 0 1 1 0 1<br>ACKN.ASM | 680e | Test system bus INT and ACK/NAK Logic<br>1) Interrupt 3c did not arrive in store.<br>2) Complemented interrupt 3c was ACKed instead of NAKed.<br>3) Interrupt Read Register on the 8259 chip's data does not match expected interrupt |
| | | 4) Check that prior interrupt cleared |
| 0 1 1 0 1<br>ACKN.ASM | 680f | Test system bus INT and ACK/NAK Logic<br>1) Interrupt 3d did not arrive in store.<br>2) Complemented interrupt 3d was ACKed instead of NAKed.<br>3) Interrupt Read Register on the 8259 chip's data does not match expected interrupt<br>4) Check that prior interrupt cleared |
| 0 1 1 0 1<br>ACKN.ASM | 6810 | Test system bus INT and ACK/NAK Logic<br>1) Interrupt 3e did not arrive in store.<br>2) Complemented interrupt 3e was ACKed instead of NAKed.<br>3) Interrupt Read Register on the 8259 chip's data does not match expected interrupt<br>4) Check that prior interrupt cleared |
| 0 1 1 0 1<br>ACKN.ASM | 6811 | Test system bus INT and ACK/NAK Logic<br>1) Interrupt 3f did not arrive in store.<br>2) Complemented interrupt 3f was ACKed instead of NAKed.<br>3) Interrupt Read Register on 8259 chip's data does not match expected interrupt<br>4) Check that prior interrupt cleared |
| 0 1 1 0 0<br>IPRI.ASM | 6001 | Test Interrupt Vector and priority<br>1) Set up of the 8259 chip failed<br>2) Unexpected interrupt occured |
| 0 1 1 0 0<br>IPRI.ASM | 6002 | Test Interrupt Vector and priority<br>1) System bus Level 3E is only legal interrupt<br>2) Inappropriate interrupt came in<br>3) Illegal vector generated from 8259 chip should be INTA = 35<br>4) Interrupt never came so time out occured<br>5) Possible problem with Master 8259 chip |
| 0 1 1 0 0<br>IPRI.ASM | 6003 | Test Interrupt Vector and priority<br>1) System bus Level 38 is only legal interrupt<br>2) Inappropriate interrupt came in<br>3) Illegal vector generated from 8259 chip should be INTA = 2B<br>4) Interrupt never came so time out occured<br>5) Possible problem with Slave B 8259 chip<br>6) Problem with Slave B talking to Master<br>7) Check that prior interrupt cleared |
| 0 1 1 0 0<br>IPRI.ASM | 6004 | Test Interrupt Vector and priority<br>1) System bus Level 30 is only legal interrupt<br>2) Inappropriate interrupt |

-continued

| PHASE LIGHTS | CAR | PROBABLE CAUSE |
|---|---|---|
| | | came in<br>3) Illegal vector generated from 8259 chip should be INTA = 22<br>4) Interrupt never came so time out occured<br>5) Possible problem with Slave 8259 chip<br>6) Problem with Slave A talking to Master<br>7) Check that prior interrupt cleared |
| 0 1 1 0 0<br>IPRI.ASM | 6005 | Test Interrupt Vector and priority<br>1) System bus Level 31 is only legal interrupt<br>2) Inappropriate interrupt came in<br>3) Illegal vector generated from 8259 chip should be INTA = 23<br>4) Interrupt never came so time out occured<br>5) Check that prior interrupt cleared |
| 0 1 1 0 0<br>IPRI.ASM | 6006 | Test Interrupt Vector and priority<br>1) System bus Level 32 is only legal interrupt<br>2) Inappropriate interrupt came in<br>3) Illegal vector generated from 8259 chip should be INTA = 24<br>4) Interrupt never came so time-out occured<br>5) Check that prior interrupt cleared |
| 0 1 1 0 0<br>IPRI.ASM | 6007 | Test Interrupt Vector and priority<br>1) System bus Level 33 is only legal interrupt<br>2) Inappropriate interrupt came in<br>3) Illegal vector generated from 8259 chip should be INTA = 26<br>4) Interrupt never came so time out occured<br>5) Check that prior interrupt cleared |
| 0 1 1 0 0<br>IPRI.ASM | 6008 | Test Interrupt Vector and priority<br>1) System bus Level 34 is only legal interrupt<br>2) Inappropriate interrupt came in<br>3) Illegal vector generated from 8259 chip should be INTA = 27<br>4) Interrupt never came so time out occured<br>5) Check that prior interrupt cleared |
| 0 1 1 0 0<br>IPRI.ASM | 6009 | Test Interrupt Vector and priority<br>1) System bus Level 35 is only legal interrupt<br>2) Inappropriate interrupt came in<br>3) Illegal vector generated from 8259 chip should be INTA = 28<br>4) Interrupt never came so time-out occured<br>5) Check that prior interrupt cleared |
| 0 1 1 0 0 | 600a | Test Interrupt Vector and |

-continued

| PHASE LIGHTS | CAR | PROBABLE CAUSE |
|---|---|---|
| IPRI.ASM | | priority<br>1) System bus Level 36 is only legal interrupt<br>2) Inappropriate interrupt came in<br>3) Illegal vector generated from 8259 chip should be INTA = 29<br>4) Interrupt never came so time-out occured<br>5) Check that prior interrupt cleared |
| 0 1 1 0 0<br>IPRI.ASM | 600b | Test Interrupt Vector and priority<br>1) System bus Level 37 is only legal interrupt<br>2) Inappropriate interrupt came in<br>3) Illegal vector generated from 8259 chip should be INTA = 2a<br>4) Interrupt never came so time out occured<br>5) Check that prior interrupt cleared |
| 0 1 1 0 0<br>IPRI.ASM | 600c | Test Interrupt Vector and priority<br>1) System bus Level 39 is only legal interrupt<br>2) Inappropriate interrupt came in<br>3) Illegal vector generated from 8259 chip should be INTA = 2c<br>4) Interrupt never came so time out occured<br>5) Check that prior interrupt cleared |
| 0 1 1 0 0<br>IPRI.ASM | 600d | Test Interrupt Vector and priority<br>1) System bus Level 3A is only legal interrupt<br>2) Inappropriate interrupt came in<br>3) Illegal vector generated from 8259 chip should be INTA = 2d<br>4) Interrupt never came so time-out occured<br>5) Check that prior interrupt cleared |
| 0 1 1 0 0<br>IPRI.ASM | 600e | Test Interrupt Vector and priority<br>1) System bus Level 3B is only legal interrupt<br>2) Inappropriate interrupt came in<br>3) Illegal vector generated from 8259 chip should be INTA = 2e<br>4) Interrupt never came so time-out occured<br>5) Check that prior interrupt cleared |
| 0 1 1 0 0<br>IPRI.ASM | 600f | Test Interrupt Vector and priority<br>1) System bus Level 3C is only legal interrupt<br>2) Inappropriate interrupt came in<br>3) Illegal vector generated from 8259 chip should be INTA = 2f<br>4) Interrupt never came so time-out occured<br>5) Check that prior interrupt cleared |
| 0 1 1 0 0 | 6010 | Test Interrupt Vector and |

| PHASE LIGHTS | CAR | PROBABLE CAUSE |
|---|---|---|
| IPRI.ASM | | priority<br>1) System bus Level 3D is only legal interrupt<br>2) Inappropriate interrupt came in<br>3) Illegal vector generated from 8259 chip should be INTA = 34<br>4) Interrupt never came so time-out occured<br>5) Check that prior in interrupt cleared |
| 0 1 1 0 0<br>IPRI.ASM | 6011 | Test Interrupt Vector and priority<br>1) System bus Level 3F is only legal interrupt<br>2) Inappropriate interrupt came in<br>3) Illegal vector generated from 8259 chip should be INTA = 36<br>4) Interrupt never came so time-out occured<br>5) Check that prior interrupt cleared |
| 0 1 1 0 0<br>IPRI.ASM | 6012 | Test Interrupt Vector and priority<br>1) System bus RINT is only legal interrupt<br>2) Inappropriate interrupt came in<br>3) Illegal vector generated from 8259 chip should be INTA = 21<br>4) Interrupt never came so time-out occured<br>5) Check that prior interrupt cleared |
| 0 1 1 0 0<br>IPRI.ASM | 6013 | Test Interrupt Vector and priority<br>1) Will load up the interrupt pending store<br>2) Then unmask the interrupt pin<br>3) Test to see that interrupts occur in correct order.<br>4) Failure due to incorrect ordering of ints.<br>5) Check that prior interrupt cleared |
| 0 1 1 0 0<br>IPRI.ASM | 6014 | Test Interrupt Vector and priority<br>1) 10 millclk is only legal interrupt<br>2) Inappropriate interrupt came in<br>3) Illegal vector generated from 8259 chip should be INTA = 30<br>4) Interrupt never came so time-out occured<br>5) Check that prior interrupt cleared |
| 0 1 1 0 0<br>IPRI.ASM | 6015 | Test Interrupt Vector and priority<br>1) 10 millclk is only legal interrupt<br>2) 10 mill clock is not 10 milliseconds<br>3) Wrong speed set in the Resource ID.<br>4) 486 is suspended and 10 mill did not unsuspend |
| 0 1 0 1 0<br>LOLK.ASM | 50xx | Local Memory Lock Test<br>1) Something went wrong with lock line |
| 0 1 0 0 1<br>FUNC.ASM | 4801 | Unused Function Code Test<br>1) Function code that is |

| PHASE LIGHTS | CAR | PROBABLE CAUSE |
|---|---|---|
| | | illegal worked<br>2) Incorrect NMI occured according to syn reg.<br>3) No NMI occured<br>4) MIO, D/C, W/R Bits not set for I/O write<br>5) PAR has wrong value in this register. |
| 0 1 0 0 1<br>FUNC.ASM | 4802 | Unused Function Code Test<br>1) Function code that is illegal worked<br>2) Incorrect NMI occured according to syn reg.<br>3) No NMI occured<br>4) MIO, D/C, W/R Bits not set for I/O read<br>5) PAR has wrong value in this register. |
| 0 1 0 0 1<br>FUNC.ASM | 4803 | Unused Function Code Test<br>1) Function code that is illegal worked<br>2) Incorrect NMI occured according to syn reg.<br>3) No NMI occured<br>4) MIO, D/C, W/R Bits not set for I/O read<br>5) PAR has wrong value in this register.<br>6) Operational Timer is not work |
| 0 1 0 0 1<br>FUNC.ASM | 4804 | Unused Function Code Test<br>1) Function code that is illegal worked<br>2) Incorrect NMI occured according to syn reg.<br>3) No NMI occured<br>4) MIO, D/C, W/R Bits not set for I/O read |
| 0 1 0 0 1<br>FUNC.ASM | 4804 | Unused Function Code Test<br>5) PAR has wrong value in this register.<br>6) Operational Timer is not work |
| 0 1 0 0 0<br>SYN.ASM | 4001 | Syndrome Register Test<br>1) Illegal memory access did not occur (BIT 26)<br>2) Syndrome register did not see a 4600<br>3) ADE bit did not go on<br>4) An NMI did not occur.<br>5) M/IO, D/C, W/R bits set incorrectly in CAR |
| 0 1 0 0 0<br>SYN.ASM | 4002 | Syndrome Register Test<br>1) Illegal memory access did not occur (BIT 27)<br>2) Syndrome register did not see a 4600<br>3) ADE bit did not go on<br>4) An NMI did not occur<br>5) M/IO, D/C, W/R bits set incorrectly in CAR |
| 0 1 0 0 0<br>SYN.ASM | 4003 | Syndrome Register Test<br>1) Illegal memory access did not occur (BIT 28)<br>2) Syndrome register did not see a 4600<br>3) ADE bit did not go on<br>4) An NMI did not occur<br>5) M/IO, D/C, W/R bits set incorrectly in CAR |
| 0 1 0 0 0<br>SYN.ASM | 4004 | Syndrome Register Test<br>1) Illegal memory access did not occur (BIT 29)<br>2) Syndrome register did not see a 4600<br>3) ADE bit did not go on<br>4) An NMI did not occur<br>5) M/IO, D/C, W/R bits set |

-continued

| PHASE LIGHTS | CAR | PROBABLE CAUSE |
|---|---|---|
| 0 1 0 0 0<br>SYN.ASM | 4005 | incorrectly in CAR<br>Syndrome Register Test<br>1) Try to write above memory space<br>2) Syndrome register did not see a 1680<br>3) PSM or PRS bit did not go on<br>4) An NMI did not occur.<br>5) M/IO, D/C, W/R bits set incorrectly in CAR |
| 0 1 0 0 0<br>SYN.ASM | 4006 | Syndrome Register Test<br>1) IO read to a WRITE function code<br>2) Syndrome register did not see a 0E10<br>3) OTO or OTY bit did not go on<br>4) An NMI did not occur<br>5) M/IO, D/C, W/R bits set incorrectly in CAR |
| 0 1 0 0 0<br>SYN.ASM | 4007 | Syndrome Register Test<br>1) Try to read EEPROM with wrong chan return<br>2) Syndrome register did not see a 2700<br>3) XRS or XUR bit did not go on<br>4) M/IO, D/C, W/R bits set incorrectly in CAR |
| 0 1 0 0 0<br>SYN.ASM | 4008 | Syndrome Register Test<br>1) SMR read with bad shbc channel<br>2) Syndrome register did not see a 0628<br>3) RRS or RUR bit did not go on<br>4) M/IO, D/C, W/R bits set incorrectly in CAR |
| 0 1 0 0 0<br>SYN.ASM | 4009 | Syndrome Register Test<br>1) Try to Read PAR without setup<br>2) Syndrome register did not see a 4600<br>3) ADE bit did not go on<br>4) M/IO, D/C, W/R bits set incorrectly in CAR |
| 0 1 0 0 0<br>SYN.ASM | 400a | Syndrome Register Test<br>1) Cause an ITP to myself and I will not answer<br>2) Syndrome register did not see a 1680<br>3) PUR or PRS bit did not go on<br>4) M/IO, D/C, W/R bits set |

-continued

| PHASE LIGHTS | CAR | PROBABLE CAUSE |
|---|---|---|
| 0 1 0 0 0<br>SYN.ASM | 400b | incorrectly in CAR<br>Syndrome Register Test<br>1) Turned RED MODE on<br>2) Syndrome register did not see a 0608<br>3) RUR bit did not go on a yellow occured<br>4) M/IO, D/C, W/R bits set incorrectly in CAR<br>5) A yellow occured and it should not |
| 0 1 0 0 0<br>SYN.ASM | 400c | Syndrome Register Test<br>1) Turned RED MODE on<br>2) Syndrome register did not see a 1680<br>3) PUR bit did not go on a yellow occured<br>4) M/IO, D/C, W/R bits set incorrectly in CAR<br>5) A yellow occured and it should not |
| 0 1 0 0 0<br>SYN.ASM | 400d | Syndrome Register Test<br>1) Turned RED MODE on<br>2) Syndrome register did not see a 0700<br>3) XUR bit did not go on a yellow occured<br>4) M/IO, D/C, W/R bits set incorrectly in CAR<br>5) A yellow occured and it should not |
| 0 0 0 1 0<br>EEP.C | 10xx | EEPROM Read/Write Test<br>1) Incorrect Address in EAR (FC = 29)<br>2) Incorrect Location read from (FC = 28)<br>3) Incorrect Location written to (FC = 2d)<br>4) Stuck at bit in EAR<br>5) Write or Read path has a problem. |
| 0 0 0 0 1<br>BOOT.ASM | 08xx | Checksum the Boot side<br>1) Problem with boot code.<br>2) PCC was unable to switch to boot side<br>3) Reload the boot side |
| 0 0 0 0 0<br>SUPER.ASM | 00xx | End of OBD.<br>1) Machine unable to suspend itself (FC = 01)<br>2) Machine unable to shutoff OBD lite.<br>3) Cache is disabled and should not be. |

I. Appendix

DESCRIPTION OF SUB-PHZ ROUTINE

```
;|***
;|*** /* This routine will set the phase lights plus
;|***     include a sub phase which will be passed to
              it. */
;|***
;|*** void sub_phz(unsigned int sub)
;|***
;|*** {
        PUBLIC      _sub_phz
_sub_phz            PROC NEAR
        push        bp
        mov         bp,sp
;|***               outpw(CARW,((phase<< 11) ! sub));
        mov         cl,3
        mov         ah,BYTE PTR_phase; phase number
        sub         al,al
        shl         ax,cl
        or          ax,WORD PTR [bp+4]; subphase number
        push        ax
        mov         ax,16640 (CAR)
        push        ax
        call        _outpw; transfer phase & subphase
                           numbers to CAR
;|*** }
        mov         sp,bp
        pop         bp
        ret _sub_phz    ENDP
```

II. EXAMPLE OBD TEST

```
;*****************************************************
; $$$ PHASE 21 $$$
; Partial Memory Write Testing LOCALLY.
;*****************************************************
;***********************************************
; Lets turn the cache off at this point in time.
;***********************************************
        mov     eax,cr0             ; get current cr0
        or      eax,CACOFF          ; set CD = 1 and NW = 1
        mov     cr0,eax             ; begin cache now enabled
        INVD                        ; invalidate the cache for
                                      read back
;****************************
;* Start of test block in esi
;* Data to be written in eax
;****************************
        mov     ax,1                ; this is the sub phase to
                                      be passed
        push    ax                  ; put value on the stack
        call    _sub_phz            ; call the set sub phase
                                      routine
        add     sp,2                ; reset the stack.

mov     esi,0005a5a58h      ; load up location of
                                      memory to clear
        mov     eax,12345678h       ; load up the data to be
                                      written.
        call    _clrmem             ; clear 12 bytes of memory
                                      starting at ESI
```

```
;***************************
;* Result after the write to
;* location edi in ebx,ecx,edx
;***************************
        mov     ebx,00000000h      ; load up results of write
        mov     ecx,00000078h      ; load up results of write
        mov     edx,00000000h      ; load up results of write
        mov     edi,0005a5a5ch     ; load up location of mem-
                                     ory to write ;***************************
;* Testing write mask of 8
;***************************
        mov     [edi],al           ; write a byte at location
                                     EDI call    _memcmp            ; Compare 12 consecutive
                                     bytes starting at ESI ;***************************
;* Start of test block in esi
;* Data to be written in eax
;***************************
        mov     ax,2               ; this is the sub phase to
                                     be passed push    ax                 ; put value on the stack
        call    _sub_phz           ; call the set sub phase
                                     routine add     sp,2               ; reset the stack.

mov     esi,0005a5a58h     ; load up location of mem-
                                     ory to clear
        mov     eax,12345678h      ; load up the data to be
                                     written.
        call    _clrmem            ; clear 12 bytes of memory
                                     starting at ESI
```

```
;****************************
;* Result after the write to
;* location edi in ebx,ecx,edx
;****************************
        mov     ebx,00000000h   ; load up results of write
        mov     ecx,00007800h   ; load up results of write
        mov     edx,00000000h   ; load up results of write
        mov     edi,0005a5a5dh  ; load up location of mem-
                                  ory to write
;****************************
;* Testing write mask of 4
;****************************
        mov     [edi],al        ; write a byte at location
                                  EDI
        call    _memcmp         ; Compare 12 consecutive
                                  bytes starting at ESI
;****************************
;* Start of test block in esi
;* Data to be written in eax
;****************************
        mov     ax,3            ; this is the sub phase to
                                  be passed
        push    ax              ; put value on the stack
        call    _sub_phz        ; call the set sub phase
                                  routine
        add     sp,2            ; reset the stack.
;
        mov     esi,0005a5a58h  ; load up location of mem-
                                  ory to clear
        mov     eax,12345678h   ; load up the data to be
                                  written.
        call    _clrmem         ; clear 12 bytes of memory
                                  starting at ESI
```

```
;****************************
;* Result after the write to
;* location edi in ebx,ecx,edx
;****************************
        mov     ebx,00000000h       ; load up results of write
        mov     ecx,00780000h       ; load up results of write
        mov     edx,00000000h       ; load up results of write
        mov     edi,0005a5a5eh      ; load up location of mem-
                                      ory to write
;****************************
;* Testing write mask of 2
;****************************
        mov     [edi],al            ; write a byte at location
                                      EDI
        call    _memcmp             ; Compare 12 consecutive
                                      bytes starting at ESI
;****************************
;* Start of test block in esi
;* Data to be written in eax
;****************************
        mov     ax,4                ; this is the sub phase to
                                      be passed
        push    ax                  ; put value on the stack
        call    _sub_phz            ; call the set phase rou-
                                      tine
        add     sp,2                ; reset the stack.
        mov     esi,0005a5a58h      ; load up location of mem-
                                      ory to clear
        mov     eax,12345678h       ; load up the data to be
                                      written.
        call    _clrmem             ; clear 12 bytes of memory
                                      starting at ESI
```

;***************************
;* Result after the write to
;* location edi in ebx,ecx,edx
;***************************
```
        mov     ebx,00000000h       ; load up results of write
        mov     ecx,78000000h       ; load up results of write
        mov     edx,00000000h       ; load up results of write
        mov     edi,0005a5a5fh      ; load up location of mem-
                                    ;   ory to write
```
;***************************
;* Testing write mask of 1
;***************************
```
        mov     [edi],al            ; write a byte at location
                                    ;   EDI
        call    _memcmp             ; Compare 12 consecutive
                                    ;   bytes starting at ESI
```
;***************************
;* Start of test block in esi
;* Data to be written in eax
;***************************
```
        mov     ax,5                ; this is the sub phase to
                                    ;   be passed
        push    ax                  ; put value on the stack
        call    _sub_phz            ; call the set sub phase
                                    ;   routine
        add     sp,2                ; reset the stack.
        mov     esi,0005a5a58h      ; load up location of mem-
                                    ;   ory to clear
        mov     eax,12345678h       ; load up the data to be
                                    ;   written.
        call    _clrmem             ; clear 12 bytes of memory
                                    ;   starting at ESI
```

```
;****************************
;* Result after the write to
;* location edi in ebx,ecx,edx
;****************************
        mov     ebx,00000000h       ; load up results of write
        mov     ecx,00005678h       ; load up results of write
        mov     edx,00000000h       ; load up results of write
        mov     edi,0005a5a5ch      ; load up location of mem-
                                    ;   ory to write ;****************************
;* Testing write mask of C
;****************************
        mov     [edi],ax            ; write a byte at location
                                    ;   EDI
        call    _memcmp             ; Compare 12 consecutive
                                    ;   bytes starting at ESI ;****************************
;* Start of test block in esi
;* Data to be written in eax
;****************************
        mov     ax,6                ; this is the sub phase to
                                    ;   be passed
        push    ax                  ; put value on the stack
        call    _sub_phz            ; call the set sub phase
                                    ;   routine
        add     sp,2                ; reset the stack.
        mov     esi,0005a5a58h      ; load up location of mem-
                                    ;   ory to clear
        mov     eax,12345678h       ; load up the data to be
                                    ;   written.
        call    _clrmem             ; clear 12 bytes of memory
                                    ;   starting at ESI
```

```
;*****************************
;* Result after the write to
;* location edi in ebx,ecx,edx
;*****************************
        mov     ebx,00000000h   ; load up results of write
        mov     ecx,56780000h   ; load up results of write
        mov     edx,00000000h   ; load up results of write
        mov     edi,0005a5a5eh  ; load up location of mem-
                                  ory to write ;*****************************
;* Testing write mask of 3
;*****************************
        mov     [edi],ax        ; write abyte at location
                                  EDI
        call    _memcmp         ; Compare 12 consecutive
                                  bytes starting at ESI ;*****************************
;* Start of test block in esi
;* Data to be written in eax
;*****************************
        mov     ax,7            ; this is the sub phase to
                                  be passed
        push    ax              ; put value on the stack
        call    _sub_phz        ; call the set sub phase
                                  routine
        add     sp,2            ; reset the stack.
        mov     esi,0005a5a58h  ; load up location of mem-
                                  ory to clear
        mov     eax,12345678h   ; load up the data to be
                                  written.
        call    _clrmem         ; clear 12 bytes of memory
                                  starting at ESI
```

```
;****************************
;* Result after the write to
;* location edi in ebx,ecx,edx
;****************************
        mov     ebx,00000000h       ; load up results of write
        mov     ecx,00567800h       ; load up results of write
        mov     edx,00000000h       ; load up results of write
        mov     edi,0005a5a5dh      ; load up location of mem-
                                      ory to write
;****************************
;* Testing write mask of 6
;****************************
        mov     [edi],ax            ; write a byte at location
                                      EDI
        call    _memcmp             ; Compare 12 consecutive
                                      bytes starting at ESI
;****************************
;* Start of test block in esi
;* Data to be written in eax
;****************************
        mov     ax,8                ; this is the sub phase to
                                      be passed
        push    ax                  ; put value on the stack
        call    _sub_phz            ; call the set sub phase
                                      routine
        add     sp,2                ; reset the stack.
        mov     esi,0005a5a58h      ; load up location of mem-
                                      ory to clear
        mov     eax,12345678h       ; load up the data to be
                                      written.
        call    _clrmem             ; clear 12 bytes of memory
                                      starting at ESI
```

```
;***************************
;* Result after the write to
;* location edi in ebx,ecx,edx
;***************************
        mov     ebx,00000000h     ; load up results of write
        mov     ecx,34567800h     ; load up results of write
        mov     edx,00000012h     ; load up results of write
        mov     edi,005a5a5dh     ; load up location of mem-
                                  ;   ory to write
;***************************
;* Testing write mask of 7
;***************************
        mov     [edi],eax         ; write a byte at location
                                  ;   EDI
        call    _memcmp           ; Compare 12 consecutive
                                  ;   bytes starting at ESI
;***************************
;* Start of test block in esi
;* Data to be written in eax
;***************************
        mov     ax,9              ; this is the sub phase to
                                  ;   be passed
        push    ax                ; put value on the stack
        call    _sub_phz          ; call the set sub phase
                                  ;   routine
        add     sp,2              ; reset the stack.
        mov     esi,0005a5a58h    ; load up location of mem-
                                  ;   ory to clear
        mov     eax,12345678h     ; load up the data to be
                                  ;   written.
        call    _clrmem           ; clear 12 bytes of memory
                                  ;   starting at ESI
```

```
;****************************
;* Result after the write to
;* location edi in ebx,ecx,edx
;****************************
        mov     ebx,00000000h       ; load up results of write
        mov     ecx,78000000h       ; load up results of write
        mov     edx,00123456h       ; load up results of write
        mov     edi,0005a5a5fh      ; load up location of mem-
                                      ory to write
;****************************
;* Testing write mask of E
;****************************
        mov     [edi],eax           ; write a byte at location
                                      EDI
        call    _memcmp             ; Compare 12 consecutive
                                      bytes starting at ESI
        call    _clrmem             ; clear 12 bytes of memory
                                      starting at ESI
;
;********************************************************
; Lets turn the cache back on at this point in time.
;********************************************************
        mov     eax,cr0             ; get current cr0
        and     eax,CACHE           ; set CD = 0 and NW = 0
        mov     cr0,eax             ; begin cache now enabled
        jmp     rtpwlo              ; return from routine
_pwlo ENDP
```

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A method of organizing and testing a processing unit board within either a system or a factory test environment, said board when installed in said system environment, being coupled to a system bus of the system in common with a number of other processing units, said board including a plurality of major parts, one of which is a high speed microprocessor, said microprocessor having an internal cache memory, memory management unit and a control read only memory for issuing commands locally and externally to said system bus, an internal register accessible only by said microprocessor and a local memory coupled to said microprocessor and to said system bus, said method comprising the steps of:

(a) including in said processing unit board, an electrically erasable programmable read only (EEPROM) unit which is connected to said microprocessor and to said system bus when installed in said system;

(b) storing in said EEPROM unit, a plurality of on-board diagnostic (OBD) routines organized in a predetermined manner for extensively testing the operability of said processing unit board, each OBD routine containing a number of tests containing a number of software instructions;

(c) accessing each of said plurality of OBD routines in a predetermined ordered sequence by said microprocessor at high speed for carrying out a different phase and subphases of testing on a predetermined part of one of said major parts of said processing unit board upon being powered on by said system or in response to a command from said system bus specifying running of said OBD routines;

(d) generating a different predetermined code at a beginning of each OBD routine for designating the phase and subphase of testing being executed by said processing unit board, said different predetermined code having a numerical value which indicates the amount of testing which has been completed;

(e) storing said each different predetermined code generated in step (d) in said internal register during execution of a corresponding one of said OBD routines; and, (f) connecting said internal register to an indicator panel for visually displaying said different predetermined code for both indicating which phase of testing could not be successfully executed by said microprocessor and the extent to which said testing has been completed enabling an operator to make a visual determination as to whether said processing unit board or major part is to be replaced.

(g) executing a local memory test routine by said microprocessor for verifying the operability of a small area within said local memory; and, (h) copying said OBD routines into said small area of local memory verified as good in step (g) for enabling execution of subsequent OBD routines to proceed at maximum speed.

2. The method of claim 1 wherein said different predetermined code includes first and second portions, said first portion corresponding to a phase code for identifying said phase of testing visually indicating the extent to which testing has been completed and said second portion corresponding to a subphase code for identifying a specific test and subphase of testing being executed by said microprocessor.

3. The method of claim 1 wherein said predetermined manner corresponds to organizing said plurality of OBD routines into a corresponding number of sequential files for executing by said microprocessor in sequential order which defines said different phases of testing starting from a highest phase to a zero phase.

4. The method of claim 1 wherein prior to executing step (c), said microprocessor performs an internal self test procedure for verifying the operation of said components and performs step (c) only upon successful completion of said procedure.

5. A method of organizing and testing a processing unit board within either a system or a factory test environment, said board when installed in said system environment, being coupled to a system bus of the system in common with a number of other processing units, said board including a plurality of major parts, one of which is a high speed microprocessor, said microprocessor having an internal cache memory, memory management unit and a control read only memory for issuing commands locally and externally to said system bus, said method comprising the steps of:

(a) including in said processing unit board, an electrically erasable programmable read only (EEPROM) unit which is connected to said microprocessor and to said system bus when installed in said system;

(b) storing in said EEPROM unit, a plurality of on-board diagnostic (OBD) routines organized in a predetermined manner for extensively testing the operability of said processing unit board, each OBD routine containing a number of tests containing a number of software instructions;

(c) accessing each of said plurality of OBD routines in a predetermined ordered sequence by said microprocessor at high speed for carrying out a different phase and subphases of testing on a predetermined part of one of said major parts of said processing unit board upon being powered on by said system or in response to a command from said system bus specifying running of said OBD routines;

(d) generating a different predetermined code at a beginning of each OBD routine for designating the phase and subphase of testing being executed by said processing unit board, said different predetermined code having a numerical value which indicates the amount of testing which has been completed;

(e) displaying said different predetermined code during executing of said OBD routines by said microprocessor for enabling an operator to make a visual determination as to whether said processing unit board or major part is to be replaced in addition to the extent of testing which has been completed;

(f) executing said number of tests of each of said plurality of OBD test routines during a corresponding number of subphases;

(g) including as part of said plurality of OBD routines, a subphase generation routine for generating said different predetermined code designating which subphase of testing is being carried out, said subphase generation routine when executed by said microprocessor generates said proper different predetermined code by combining a generated phase code value with a subphase parameter value received from a last executed one of said number of said tests and shifting a combined result by a predetermined number of bit positions for proper alignment during display;

(h) including in each OBD routine, a number of subroutine calls to said subphase generation routine, said number of subroutine calls corresponding in number to said number of tests contained in said each OBD routine for generating the proper different predetermined code prior to execution of each of said number of tests for designating said subphases; and wherein said system further includes analysis equipment operatively coupled to said processing unit board for determining which part of said processing unit board is faulty and said method further including the steps of:

(i) storing in said analysis equipment, a test dictionary containing a plurality of descriptions of the faulty components detectable by each of said plurality of OBD routines; and, (j) accessing said test dictionary by said analysis equipment upon detecting an error condition using said different predetermined code when testing was stopped by said microprocessor for determining which major part components should be replaced.

6. The method of claim 5 wherein said analysis equipment is a personal computer or analyzer apparatus.

7. A method of organizing and testing a processing unit board within either a system or a factory test environment, said board when installed in said system environment, being coupled to a system bus of a system in common with a number of other processing units, said board including a plurality of major parts, one of which is a high speed microprocessor, said microprocessor having an internal cache memory, memory management unit and control read only memory for issuing commands locally and externally to said system bus, said method comprising the steps of:

(a) including in said processing unit board, an electrically erasable programmable read only (EEPROM) unit which is connected to said microprocessor and to said system bus when installed in said system;

(b) storing in said EEPROM unit, a plurality of on-board diagnostic (OBD) routines organized in a predetermined manner for extensively testing the operability of said processing unit board, each OBD routine containing a number of tests containing a number of software instructions;

(c) accessing each of said plurality of OBD routines in a predetermined ordered sequence by said microprocessor at high speed for carrying out a different phase and subphases of testing on a predetermined part of one of said major parts of said processing unit board upon being powered on by said system or in response to a command from said system bus specifying running of said OBD routines;

(d) generating a different predetermined code at a beginning of each OBD routine for designating the phase and subphase of testing being executed by said processing unit board, said different predetermined code having a numerical value which indicates the amount of testing which has been completed; and, (e) displaying said different predetermined code during executing of said OBD routines by said microprocessor for enabling an operator to make a visual determination as to whether said processing unit board or major part is to be replaced in addition to the extent of testing which has been completed;

(f) including in said plurality of OBD routines, a number of external tests specifying the generation of different I/O commands to said system bus designating said processing unit; and, (g) executing said number of external tests by said microprocessor for verifying that said processing unit is able to communicate with other units connected to said system bus.

8. A system for testing a processing unit board of a system within either a system or factory environment, said processing unit board including a plurality of major parts one of which is a microprocessor coupled to a local bus, said microprocessor including a plurality of components which include an internal cache memory, memory management unit and control read only memory for issuing commands locally, said local bus being coupled to said system bus in common with a number of other processing units for issuing commands externally to said system bus, said board further comprising:

an electrically erasable programmable read only memory (EEPROM) unit coupled to said system bus, said EEPROM unit including a plurality of locations for storing software instructions of a plurality of on-board diagnostic (OBD) routines, each containing a number of subtests organized to be executed in a predetermined order corresponding to a number of testing phases and subphases for extensively testing said plurality of major parts of said board further comprising;

means coupling said EEPROM unit to said microprocessor;

internal register means coupled to said microprocessor for storing a different predetermined code designating said phases generated by said microprocessor at a beginning of each OBD routine and subphases generated during execution of said each OBD routine for designating which testing phase and subphase within said phase is being executed, said different predetermined code having a numerical value which indicates the amount of testing which has been completed, said internal register means including first and second sections, said first section being coupled to said microprocessor and in response to each I/O command from said microprocessor designating a write operation to said internal register means, storing one of said predetermined codes until receipt of a next I/O command designating a write operation to said register and said second section being coupled to said first section and to said microprocessor, said second section in response to each I/O command designating a read operation to said internal register means, transferring predetermined information contained in said first section stored in conjunction with performing another function to said microprocessor for carrying out said another function; and, display means coupled to said internal register means for displaying said different predetermined code for enabling an operator to make a visual determination as to whether said processing unit board or which major part should be replaced and said extent of testing which has been completed.

9. The system of claim 8 wherein said OBD routines being executed by said microprocessor follows successful execution of an internal self test procedure by said microprocessor which verifies the operability of said plurality of components.

10. The system of claim 8 wherein said processing unit board includes a clock generator for generating a reference clock signal for synchronizing operations within said processing unit board and wherein said first section includes a programmable array logic (PAL) circuit coupled to said clock generator for receiving said reference clock signal and said PAL circuit including register circuits for storing each of said predetermined codes in response to said reference clock signal.

11. The system of claim 10 wherein said PAL circuit couples to said display means, said PAL circuit in response to said reference clock signal applying signals to said display means indicating the phase of testing being performed by said microprocessor.

12. The system of claim 10 wherein said other function is to store channel information used in issuing I/O commands to said system bus.

* * * * *